United States Patent [19]
Leorat et al.

[11] Patent Number: 4,691,597
[45] Date of Patent: Sep. 8, 1987

[54] CONTROL SYSTEM FOR A FOUR-SPEED AUTOMATIC TRANSMISSION

[75] Inventors: François Leorat, Versailles; Patrick Coutant, Rueil Malmaison; Paul Aubert, Clamart, all of France

[73] Assignee: Regie Nationale des Usines Renault, Boulogne-Billancourt, France

[21] Appl. No.: 777,444

[22] Filed: Sep. 18, 1985

[30] Foreign Application Priority Data

Sep. 18, 1984 [FR] France .................. 84 14262

[51] Int. Cl.⁴ .................. B60K 41/18; B60K 41/16
[52] U.S. Cl. .................. 74/869; 74/867; 74/866
[58] Field of Search .................. 74/865–869, 74/752 C

[56] References Cited

U.S. PATENT DOCUMENTS

| | | | |
|---|---|---|---|
| 3,487,851 | 1/1970 | Golan et al. | 137/494 |
| 3,505,909 | 4/1970 | Maurice | 74/864 |
| 3,902,380 | 9/1975 | Murakami | 74/868 |
| 4,006,652 | 2/1977 | Murakami | 74/869 |
| 4,290,324 | 9/1981 | Aubert et al. | 74/866 |
| 4,331,044 | 5/1982 | Bookout et al. | 74/762 |
| 4,354,236 | 10/1982 | Aisin-Warner . | |
| 4,422,536 | 12/1983 | Shatuck | 74/752 C |
| 4,555,964 | 12/1985 | Sugano | 74/869 |

FOREIGN PATENT DOCUMENTS 0039936 11/1981 European Pat. Off. .
2062782 5/1981 United Kingdom .

*Primary Examiner*—Leslie Braun
*Assistant Examiner*—Dirk Wright
*Attorney, Agent, or Firm*—Oblon, Fisher, Spivak, McClelland, & Maier

[57] ABSTRACT

Control device of an automatic transmission having four forward speeds with shifting under torque together with a hydrokinetic torque converter with an integrated torsional damper, and one reverse speed, of the type comprising a planetary gear train controlled by three clutches and two brakes with hydraulic control. A hydraulic distributor controlled by four solenoid valves selectively feeds the clutches and brakes, depending on the running conditions of the vehicle. The control means of the solenoid valves are made to use two states of one of these solenoid valves to allow fast filling and progressiveness of the active receiver or receivers during shifting and two states of the other solenoid valves to assure the various sequences during shifting.

37 Claims, 40 Drawing Figures

FIG.3

| POSITION | | Rapport | E1 | E2 | E3 | F1 | F2 | RL |
|---|---|---|---|---|---|---|---|---|
| P | | N | | | | | | |
| R | | R | | X | | X | | |
| R | | S | | | | | | X |
| N | | N | | | | | | |
| A | 2 | 1H | X | | | | | X |
| A | 2 | 2H | X | | | | X | |
| A | 3 | 3H | X | X | X | | | |
| A | 3 | 3DP | X | | X | | | |
| A | 3 | 3M | X | X | | | | |
| A | | 4M | | X | | | X | |
| | 1 | 1HFM | X | | | X | | X |

FIG. 3A

| | EV1 VA | EV2 VB | EV3 VC | EV4 VP | Evda | EVM | Vc²₃ | Vc³₄ | E1 | E2 | E3 | F1 | F2 | RL | ETATS |
|---|---|---|---|---|---|---|---|---|---|---|---|---|---|---|---|
| P | 0 | 0 | 0 | 0 | 0 | m | 0 | 0 | 0 | 0 | 0 | 0 | 0 | 0 | 1 |
| | 0 | 0 | 0 | 1 | 0 | m | 0 | 0 | 0 | pt | 0 | GT | 0 | 0 | 2 |
| R | 0 | 0 | 0 | 0 | 0 | m | 0 | 0 | 0 | GT | 0 | GT | 0 | 0 | 3 |
| N | 0 | 0 | 0 | 0 | 0 | m | 0 | 0 | 0 | 0 | 0 | 0 | 0 | 0 | 4 |
| 3H | 0 | 0 | 0 | 0 | 0 | m | 0 | 0 | GT | GT | 0 | 0 | 0 | 0 | 5 |
| | 0 | 0 | 0 | 1 | 0 | m | 0 | 0 | pt | pt | 0 | 0 | 0 | 0 | 6 |
| DA | 0 | 0 | 0 | 1 | m | 0 | 0 | 0 | $m_{pt}$ | pt | 0 | 0 | 0 | 0 | 7 |
| 1H | 0 | 1 | 0 | 0 | 0 | m | 0 | 0 | GT | 0 | 0 | 0 | 0 | 1 | 8 |
| | 0 | 1 | 0 | 1 | 0 | m | 0 | 0 | pt | 0 | 0 | 0 | 0 | 1 | 9 |
| 1HFM | 0 | 1 | 1 | 0 | 0 | m | 0 | 0 | GT | 0 | 0 | GT | 0 | X | 10 |
| | 0 | 1 | 1 | 1 | 0 | m | 0 | 0 | GT | 0 | 0 | pt | 0 | X | 11 |
| 2H | 0 | 0 | 1 | 0 | 0 | m | 0 | 0 | GT | 0 | 0 | 0 | GT | 0 | 12 |
| | 0 | 0 | 1 | 1 | 0 | m | 0 | 0 | GT | 0 | 0 | 0 | pt | 0 | 13 |
| | 0 | 0 | 1 | 0 | 1 | m | 0 | 0 | GT | 0 | 0 | 0 | GT | 0 | 14 |
| | 1 | 0 | 1 | 1 | 0 | m | 0 | 0 | GT | 0 | GT | 0 | pt | 0 | 15 |
| | 1 | 0 | 1 | 1 | 0 | m | 1 | 0 | GT | 0 | pt | 0 | 0 | 0 | 16 |
| 3M | 1 | 0 | 0 | 0 | 0 | m | 1 | 0 | GT | GT | GT | 0 | 0 | 0 | 17 |
| | 1 | 0 | 0 | 1 | 0 | m | 1 | 0 | pt | pt | GT | 0 | 0 | 0 | 18 |
| | 1 | 1 | 0 | 0 | 0 | m | 1 | 0 | GT | 0 | GT | 0 | 0 | 0 | 19 |
| | 1 | 1 | 0 | 1 | 0 | m | 1 | 0 | pt | 0 | GT | 0 | 0 | 0 | 20 |
| | 1 | 1 | 1 | 1 | 0 | m | 1 | 0 | GT | 0 | GT | 0 | GT | 0 | 21 |
| | 1 | 1 | 1 | 1 | 0 | m | 1 | 1 | 0 | 0 | GT | 0 | pt | 0 | 22 |
| 4M | 1 | 1 | 1 | 0 | 0 | m | 1 | 1 | 0 | 0 | GT | 0 | GT | 0 | 23 |

CONTROL SYSTEM FOR A FOUR-SPEED AUTOMATIC TRANSMISSION

BACKGROUND OF THE INVENTION

1. Field of the Invention

This invention relates to a control system for an automatic transmission having four main forward speeds and one reverse speed, and equipped with a hydrokinetic torque converter provided with a torsional vibration damper intended to filter the irregularities of engine torque at the speeds for which the converter does not intervene in the transmission of the engine torque.

2. Discussion of Background

Automatic transmissions of this type for motor vehicles are already known which mainly comprise a hydrokinetic torque converter with an integrated torsional-vibration damper, and a planetary gear train transmission, as well as a set of hydraulic, and optionally electronic, control devices that, for control of the various elements of the transmission, take into account the data on the operation of the vehicle, such as particularly but in a nonlimiting way, its speed and load of the engine or the position of the accelerator pedal.

Association of a torque converter and a planetary gear train makes it possible to obtain a continuous variation of the torque applied to the wheels of the vehicle during starts, and on the lower speeds using the torque converter. Moreover, shifts can be made quickly under torque and are damped by the hydrokinetic torque converter and its torsion damper, giving the transmission a great flexibility in operation.

The planetary gear train is controlled by a certain number of hydraulic receivers: in the case of a transmission with four main forward speeds and one reverse, it is possible to use three clutches and two hydraulic-actuated brakes. Shifting is performed sequentially by applying or releasing one of these receivers and releasing or applying the other receiver.

SUMMARY OF THE INVENTION

This invention has as its object a control device for such an automatic transmission which assures the necessary shifts between the various forward gears either by shifting up under torque or by shifting down with interruption of torque, while making it possible to obtain forward speeds complementary to the four main speeds and necessary for shifts or of a safeguard nature and to obtain a reverse speed.

The device according to this invention makes it possible to separate the control function of the various elements of the automatic transmission and the control decision function as well as to provide certain delay time functions necessary for determining the time of transitory states between two speeds of the transmission. It is then possible to entrust these latter functions to specially suited means and, preferably in particular, to electronic means.

The device according to the invention is particularly suited to control of an automatic transmission having four main forward speeds with shifting up under torque, and a reverse speed, equipped with a hydrokinetic torque converter, for motor vehicles. The automatic transmission is preferably of the type comprising a planetary gear train controlled by three clutches and two hydraulic-actuated brakes.

The device according to the invention includes a hydraulic distributor controlled by four sequential solenoid valves to selectively feed the three clutches and two control brakes of the planetary gear train. The four solenoid valves are excited as a function of data relating to the operation of the vehicle equipped with the transmission. This data in particular and in a nonlimiting way can be the speed of the vehicle and the load of the driving engine of the vehicle or the position of the accelerator pedal.

According to the invention, a fifth modulating type solenoid valve is excited as a function of the parameters characterizing the operation of the vehicle and assures, in cooperation with a spool of a pressure control valve, the level of the pressure of the hydraulic fluid for controlling the clutches and brakes.

According to an embodiment of the invention, the control device has three shift valves, and a locking and progressiveness valve, each of these valves having a spool with on-off control by a sequence solenoid valve. The eight possible combinations of the three spools of the shift valves determine the same number of feed combinations of the three clutches and two brakes controlling the planetary gear train. Each feed combination corresponds to a mechanical configuration of the planetary gear train used to obtain the various forward and reverse speeds that are desired.

The locking and progressiveness valve makes it possible, in rest position, to feed the various hydraulic receivers through a large-section restriction, in particular during established speed phases (locking function). This same locking and progressiveness spool, when its solenoid valve is excited, allows feeding of these same hydraulic receivers only through a small-section passage restriction, which results in a slow and progressive filling of these latter hydraulic receivers (progressiveness function). Each spool of the three sequence (shift) valves and the locking and progressiveness valve is controlled by the corresponding sequence solenoid valve in its excited position, at a constant control pressure, called a reference pressure, controlled by a control spool; it is brought to rest position by an intermediate pressure obtained by a pressure divider fed from the reference pressure.

The device according to the invention further has a first cutoff valve, which makes it possible to cut off the feed of the second gear reaction member when the pressure in the third gear reaction member reaches a sufficient level to allow the transmission of the totality of the reaction torque on the third gear. The spool of this cutoff valve is of symmetrical design. The device also has a second cutoff valve, whose spool is geometrically identical with the spool of the first cutoff valve which, in a way identical with that of the first cutoff valve, makes it possible to cut off the feed of the third gear reaction member, when the pressure in the reaction member of the fourth gear reaches a sufficient level to allow the transmission of the totality of the reaction torque on the fourth gear.

The device according to the invention is completed by a manual valve of symmetrical design, which selects either forward or neutral or reverse. Finally, the device has a limiting valve of the feed pressure of the hydrokinetic torque converter, and a safety valve acting as a safeguard element of the hydraulic device in case of accidental excess pressure.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 3 is a table grouping the states of the various switching elements, i.e., the clutches, brakes and freewheel, depending on the position of the selector lever and the engaged gear in which a cross indicates the corresponding active element;

FIG. 3A is a table of the states of the various elements of the control device and of the transmission depending on the position of the selector lever and the engaged gear, in which each state is identified by a number located in the last column on the right of the Figure;

FIG. 7 shows the configuration of the hydraulic circuit for the second transitory phase of a neutral-reverse shift;

DESCRIPTION OF THE PREFERRED EMBODIMENTS

Figure 1:
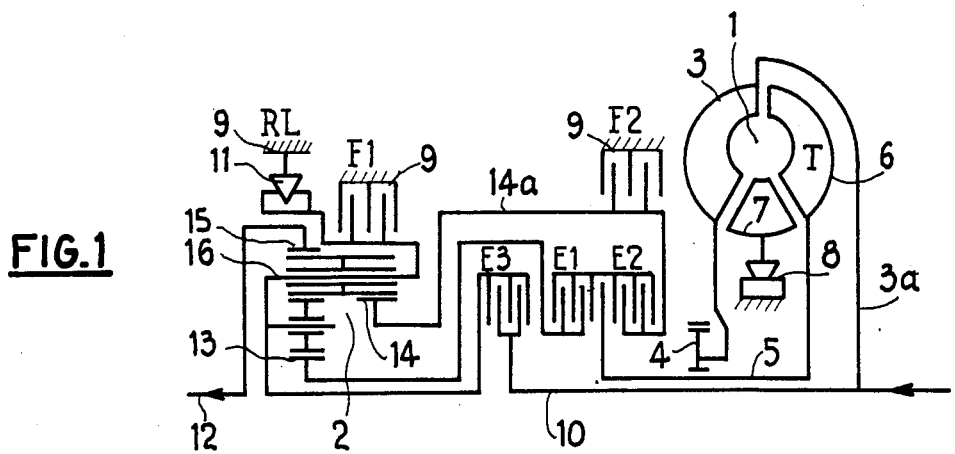
FIG. 1 diagrammatically shows the main elements of an automatic transmission which the device according to the invention is intended to control.

In a nonlimiting example which will be the object of a detailed description, the automatic transmission is as shown in FIG. 1. The transmission includes a hydrokinetic torque converter 1 and a transmission with planetary gear train 2. Hydrokinetic torque converter 1 includes, in a conventional way, three elements: impeller 3, provided with a damping system (not shown) connected to the driving motor of the vehicle, also not shown in the Figure, and driving a service pump 4 of the transmission, a turbine 6 whose shaft 5 constitutes one of the input shafts of transmission 2, and a reactor 7 mounted by a freewheel device 8.

Planetary gear train 2 is housed in a housing 9 of the mechanism. This planetary gear train 2 receives the torque from converter 1 by turbine shaft 5, and the drive torque by shaft 10 connected to the impeller by element 3a, and transmits it by output shaft 12 to the final reduction system of the transmission.

The various transmission ratios are obtained by means of a first clutch $E_1$, a second clutch $E_2$, a third clutch $E_3$, a first brake $F_1$, a second brake $F_2$ and a freewheel device 11 (RL). The three clutches and two brakes can be hydraulically controlled in a known way. In practice, it is possible to use multidisc clutches subjected to the action of a piston moved by a hydraulic fluid put under pressure by pump 4.

The kinematic arrangement of planetary gear train 2 is standard and known in the art under the name of the Ravigneaux I type train. The various combinations of operation of the control or switching elements of the planetary gear train (three clutches, two brakes, a freewheel) make it possible to obtain the four main forward speeds (1H, 2H, 3M, 4M), reverse (R), neutral (N), as well as a temporary forward speed (3DP) used functionally during the evolutions of hydraulic second gear (2H)-mechanical third gear (3M) and mechanical fourth gear (4M)-mechanical third gear (3M) shifts. An extra forward and emergency gear (3H), and a safeguard position (S) makes it possible to keep from destroying the transmission in case of an untimely maneuver of the selector lever from a forward position to reverse position.

A man of the art familiar with the standard arrangements of planetary gear trains can easily verify that:

When only clutch $E_1$ is applied, a positive torque is applied by the engine to impeller 3 of torque converter 1, freewheel 11 is locked, and there is obtained, between turbine shaft 5 (input shaft) and output shaft 12, a reduction ratio equal to $N_c/N_{p1}$ where $N_c$ designates the number of teeth of ring gear 15 and $N_{p1}$ the number of teeth of planet gear 13. It is the hydraulic first forward gear called "1H" where "H" indicates that the totality of the torque passes hydraulically through the torque converter.

When, in addition to clutch $E_1$, brake $F_1$ is applied, the same reduction ratio is obtained between turbine shaft 5 and output shaft 12 as above, but independently of the sense of the torque applied to impeller 3. Unlike the previous ratio, this ratio makes it possible to obtain engine braking. This is the hydraulic first forward gear with engine brake called "1 HFM".

When clutch $E_1$ and brake $F_2$ are simultaneously applied, freewheel device 11 is unlocked, and there is obtained, between turbine shaft 5 and output shaft 12, a reduction ratio equal to:

$$N_c/N_{p1} \times (N_{p1}+N_{p2})/(N_c+N_{p2}),$$

where $N_{p2}$ designates the number of teeth of planet gear 14. It is the hydraulic forward second gear called "2H".

When clutches $E_1$ and $E_2$ are simultaneously applied, the planetary gear train is locked. Consequently, the reduction ratio between turbine shaft 5 and output shaft 12 is equal to unity. This is the hydraulic forward third gear called "3H".

When clutches $E_1$ and $E_3$ are simultaneously applied, the output torque on shaft 12 is equal to the sum of torque $C_{E1}$ exerted by turbine 6 on shaft 5 and on planet gear 13, and of torque $C_{E3}$ exerted by impeller 3 on shaft 10, on planet pinion holder 16 of planetary gear train 2, these torques being in the ratio $N_c/N_{p1}-1$. Further, if torque converter 1 is in the coupling state, the torque on output shaft 12 is equal to the engine torque. Under these conditions, this ratio providing a division of power is the forward third gear in division of power called "3DP".

When clutches $E_1$, $E_2$ and $E_3$ are simultaneously applied, the unit of planetary gear train 2 and hydrokinetic torque converter 1, mechanically locked, rotate at the speed of the engine and no torque is transmitted by torque converter 1. This ratio is the forward mechanical third gear called "3M".

When clutch $E_3$ and brake $F_2$ are simultaneously applied, no torque is transmitted by torque converter 1. The totality of the engine torque is transmitted mechanically by the shaft of impeller 10, and the reduction ratio between the impeller shaft 10 and output shaft 12 is given by the ratio $N_c/(N_c+N_{p2})$. This is the forward mechanical fourth gear called "4M".

When clutch $E_2$ and brake $F_1$ are simultaneously applied, there is obtained a negative reduction ratio equal to $-N_c/N_{p2}$ between turbine shaft 5 and impeller shaft 10. This is the reverse gear called "R". Transmission of the torque is totally hydraulic through hydrokinetic torque converter 1.

When only brake $F_2$ is applied, no torque can be transmitted in the transmission, for lack of an input clutch. The importance of this safeguard configuration called "S", which will make it possible to assure the safety of the vehicle and transmission in unusual circumstances, will be explained later.

Figure 2:
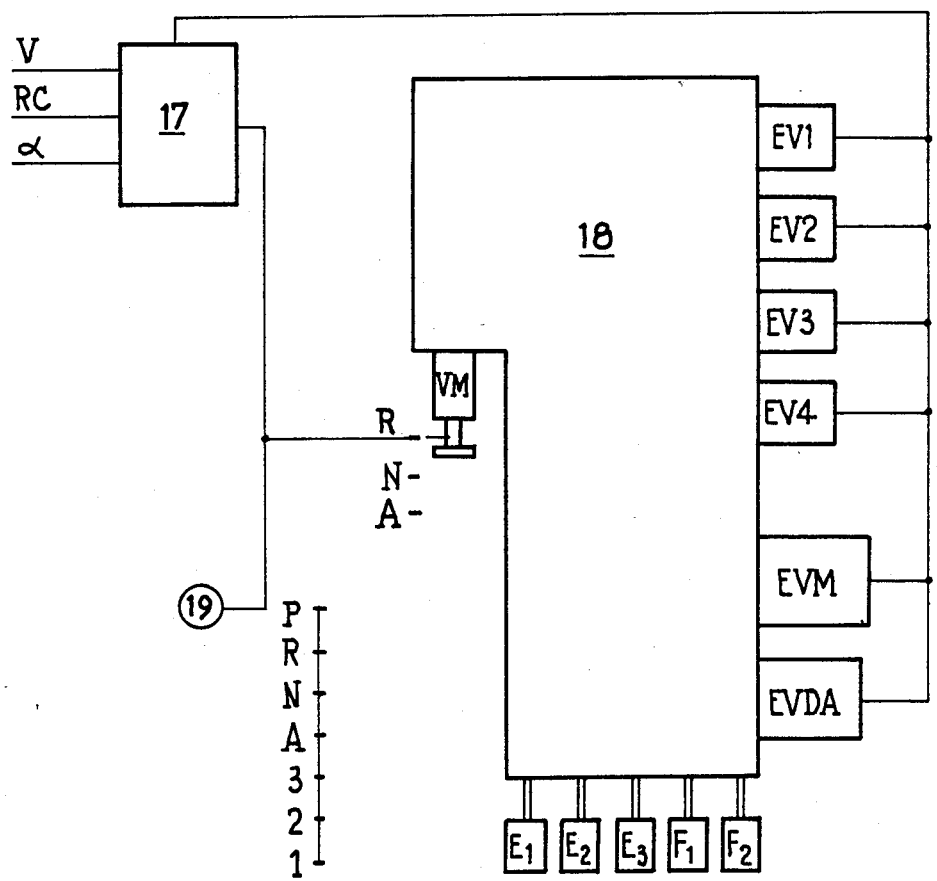
FIG. 2 is a block diagram of the control device to which the invention relates.

The main elements of the control device of the invention are shown diagrammatically in FIG. 2. It is seen in this Figure that the device according to the invention has a hydraulic distributor unit 18 which selectively feeds, at its output, three clutches $E_1$, $E_2$ and $E_3$ and two brakes $F_1$ and $F_2$, which control planetary gear train 2 shown in FIG. 1.

As appears in FIG. 4A, distributor 18 is fastened, by screws (not shown) in a suitable location of housing 9, from which it is separated by a distribution sheet metal 52 piece, in which are drilled all the various functional jets (restrictions) whose role will be described below.

Hydraulic distributor unit 18 receives data on the operation of the vehicle by means of an electronic device 17, usually called a governor, which provides control signals to four sequence solenoid valves EV1, EV2, EV3 and EV4 controlling the hydraulic distributor, as well as to a modulating solenoid valve EVM and a stop declutching solenoid valve EVDA, whose roles will be described in more detail below. The electronic comparator device 17 receives, in a nonlimiting way, signals corresponding to the vehicle speed V and the load of the driving engine, which can, in a nonlimiting way, be reflected by the angular position α of the element metering the fuel to the engine, optionally at the completely depressed position of the accelerator pedal indicated by a contact called "retrocontact" RC, or the contact called "kick-down." Comparator governor 17 also receives a signal coming from the position of manual selector lever 19, or any other suitable means, which is mechanically connected to a manual valve VM which also acts on hydraulic unit 18.

Selector lever 19 can take seven positions:
1. "Imposed first" position, marked 1;
2. "Forbidden third" (or imposed second) position, marked 2;
3. "Forbidden fourth" (or third imposed) position, marked 3;
4. "Automatic" position, marked A;
5. "Neutral" position, marked N;
6. "Reverse" position, marked R; and
7. "Park" (or locked stop) position, marked P.

Manual valve VM, thanks to a suitable mechanism, senses only three different positions corresponding to only positions R, N, A of selector lever 19.

The table of FIG. 3A shows, among other things, the excitation state of the four solenoid valves EV1 to EV4 depending on the position of the selector lever 19, and depending on the gear engaged by the transmission. In this table, the symbol 0 indicates that the electromagnet of the corresponding solenoid valve is not electrically excited so that the corresponding solenoid valve is open and allows a hydraulic fluid flow to pass. On the other hand, the symbol 1 indicates that the electromagnet of the corresponding solenoid valve is electrically excited so that the solenoid valve is closed and does not let hydraulic fluid pass.

In the positions "automatic" A, "forbidden fourth" (third imposed), marked 3 on selector lever 19, and "forbidden third" (imposed second), marked 2 on selector lever 19, shifting of the transmission is controlled by electronic device 17, as a function particularly of the speed of the vehicle and of the position α of the accelerator pedal according to suitable laws for an automatic transmission.

Hydraulic distributor unit 18 has the function of assuring, depending on the data that it receives from device 17 and manual valve VM, on the one hand, control of the pressure level of the essential hydraulic fluid so that the various hydraulic receivers can transmit the instantaneous torques in all the configurations of the transmission and, on the other hand, selective feeding of hydraulic fluid to clutches $E_1$, $E_2$, $E_3$ and brakes $F_1$ and $F_2$, as indicated, among other things, on the table of FIG. 3A. In this table 0 signifies, as above, that the corresponding receiver is not fed hydraulic fluid, while the symbol "GT" signifies that the corresponding receiver is fed simultaneously through a large-section jet and a small-section jet which is equivalent to a feed duct provided with a restriction (nozzle) with a large passage section; and the symbol "pt" signifies that the receiver in question is fed through a small-section jet which is equivalent to a feed duct provided with a restriction (nozzle) with a small passage section. The symbol "mpt" will be explained below in relation to the functioning of stop declutching solenoid valve EVDA.

The various elements constituting hydraulic unit 18 are shown in FIGS. 4 to 35. The structure of these various elements will now be described.

The device mainly comprises three sequence valves referenced VA, VB and VC, and a progressiveness valve VP, each of which is associated with one of solenoid valves EV1, EV2, EV3 and EV4 and which are shown in the Figures as an electromagnet and a ball. Sequence valves VA, VB, VC and progressiveness valve VP each include a two-position distribution spool, referenced respectively, 127, 128, 129 and 130 (FIGS. 27–30).

Figure 31:
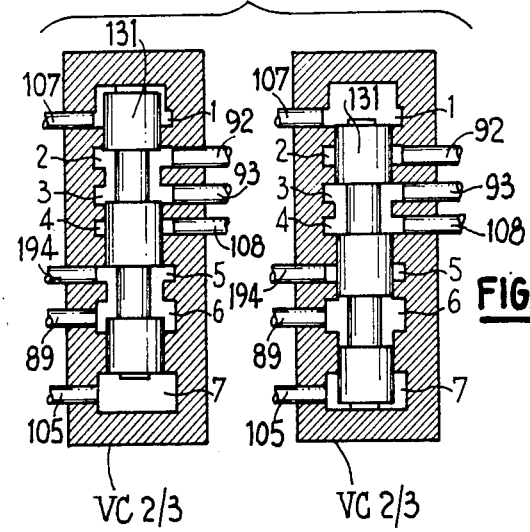
FIG. 31 shows, in section, cutoff valve VC 2/3 in its two states.
Figure 32:
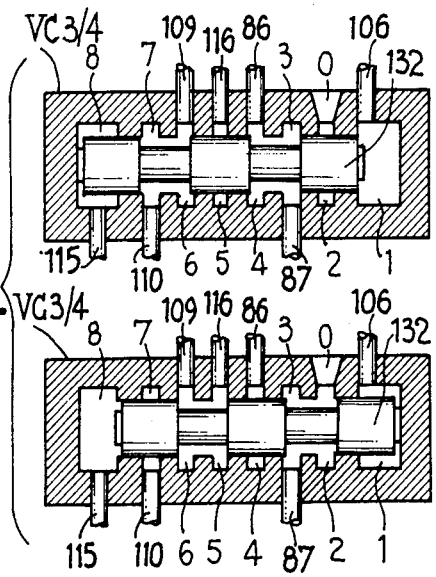
FIG. 32 shows, in section, cutoff valve VC 3/4 in its two states.
Figure 33:
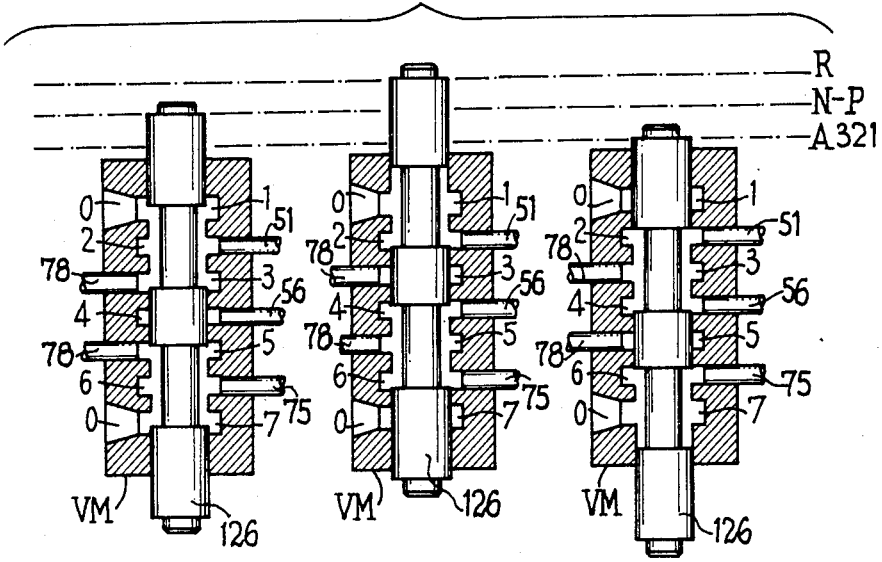
FIG. 33 shows, in section, manual valve VM in its three states.

Hydraulic distributor unit 18 also comprises two cutoff valves VC 2/3 and VC 3/4 each having a two-position distribution spool 131, 132 (FIGS. 31 and 32). These cutoff valves respectively assure switching of the hydraulic receivers of planetary gear train 2 necessary for the shifting up from second to third, and from third to fourth.

Hydraulic distributor unit 18 further comprises a manual valve VM allowing feeding of the device with hydraulic fluid for the various receivers $E_1$, $E_2$, $E_3$, $F_1$ and $F_2$. It includes a spool 126 (FIG. 33) with three positions: reverse, neutral or parking, and forward.

The hydraulic distributor unit is fed by a variable capacity positive displacement pump 20 pumping hydraulic fluid from a pan through a strainer.

Hydraulic distributor unit 18 also includes the various elements that are necessary for the various pressure levels which are to be controlled for operation of the device. The various elements are pressure control valve VRP, intended to provide the various line pressure levels necessary for the hydraulic circuit; a control valve VLP 3; pressure control valve VLP 5 intended to feed the hydraulic circuit of heat exchanger 47, hydrokinetic torque converter 1 and lubricating circuit 49; and a safety valve CS. These elements and their operation are described in greater detail in Applicants' co-pending U.S. patent applications Ser. Nos. 777,325 and 777,326, respectively, entitled "Two Range Pressure Control System" and "Two Level Pressure Control Device" both filed on Sept. 18, 1985.

Each of the elements of hydraulic distributor unit 18 has a body provided with various chambers referenced by the number of the chamber followed by the reference of the element in question; for example, chamber number 1 of sequence valve VA will be referenced: "chamber 1 VA".

Figure 4:
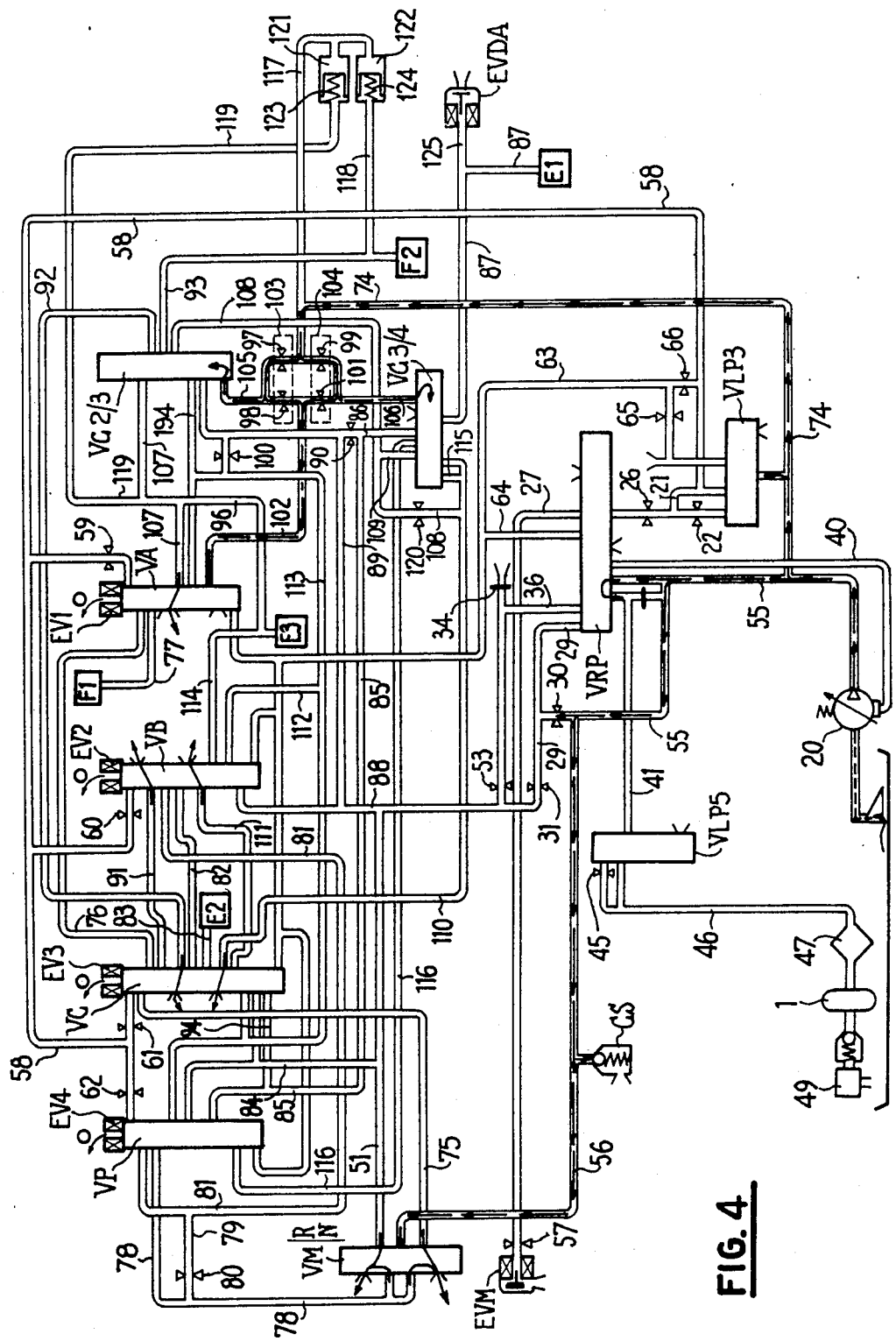
FIG. 4 diagrammatically shows the part of the hydraulic circuit of the device showing the various ducts fed hydraulic fluid for the configuration of the transmission corresponding to the neutral, reverse and parking positions of the selector lever, and relating to the pressure control system.
Figure 34:
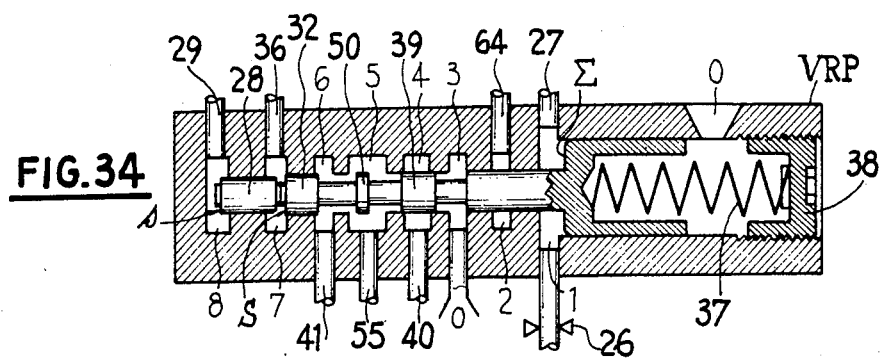
FIG. 34 shows, in section, pressure control valve VRP.
Figure 36:
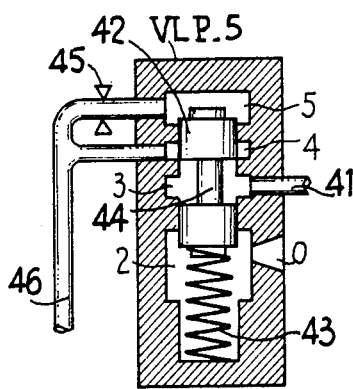
FIG. 36 shows, in section, pressure control valve VLP 5.
Figure 35:
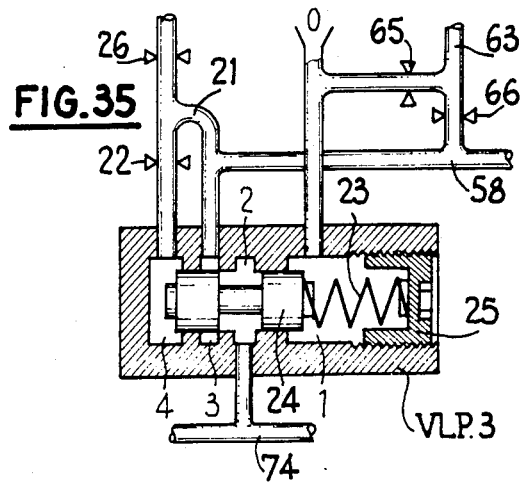
FIG. 35 shows, in section, pressure control valve VLP 3.

There will first be described, with reference to FIGS. 4 and 34, the unit of the hydraulic fluid pressure control system. This system can be of any type, to the extent that it is able to provide the pressure levels necessary for the operation of hydraulic distributor unit 18. This system, in a preferred embodiment, is compatible, by the structure of pressure control valve VRP, with a vane pump 20 having a capacity that is variable by control of its eccentricity. It should be noted that this system is adaptable, without any change of principle, to a standard fixed displacement pump, by a minor modification of pressure control valve VRP which is obvious to one skilled in the art.

Pressure control valve VRP has two spools 32 and 28 defining, together with the body of the valve, eight chambers respectively referenced, from right to left as 1, 2, 3, 4, 5, 6, 7 and 8. A spring 37 biases spools 28 and 32 to the left and is held by a threaded plug 38.

Pressure control valve VLP 3 (FIG. 35) includes a spool 24, which, with together the body of the control valve, delimits four chambers respectively referenced from right to left 1, 2, 3 and 4. A spring 23, which biases spool 24, to the left is held by a threaded plug 25.

The output pressure of pump 20 is introduced into chamber 2 VLP 3, whose spool 24 is of symmetrical design. The controlled pressure, prevailing in duct 21 connected to chamber 3 VLP 3, is introduced into chamber 4 VLP 3, through damping jet 22, thus balancing the thrust of spring 23 on the other end of spool 24. The pressure thus controlled, whose value is fixed by the force of spring 23, can be adjusted by screw plug 25 screwed into the body of distributor 18, and serves as a reference pressure P1 for all the other functions of hydraulic distributor unit 18. Duct 21 is connected, through calibrated jet 26, to chamber 1 VRP of pressure control valve VRP where the pressure prevailing downstream from jet 26 acts on the differential section $\Sigma$ of pressure control valve VRP. Duct 27 connects chamber 1 VRP to modulating solenoid valve EVM. This modulating solenoid valve EVM, of the normally open type, makes it possible to cause to prevail in duct 27, and therefore in chamber 2 of the differential section of valve VRP, a continuously variable pressure PM varying between reference pressure $P_1$ prevailing upstream from jet 26 (closed valve EVM) and a residual value close to 0 (zero) (open valve EVM).

Duct 29 is kept at an intermediate pressure equal to line pressure $P_L$ multiplied by the divider coefficient $\lambda$ of a hydraulic potentiometer made up of calibrated jets 30 and 31 in series, inserted in duct 55 where line pressure $P_L$ prevails and duct 51 set at 0 by manual valve VM. The pressure prevailing in duct 29 acts, within chamber 8 VRP of valve VRP, on spool 28 whose section s is less than section S of spool 32 of valve VRP. Moreover, chamber 7 VRP of valve VRP is set at 0 due to duct 36, connected to duct 51 by jet 53, so that the equation of the unit of valve VRP is written as:

$$s \cdot \lambda \cdot P_L + \Sigma \cdot P_M = F,$$

where F designates the return force of spring 37. There is obtained:

$$P_L = F/(\lambda \cdot s) - (\Sigma/\lambda \cdot s) \cdot P_M, \tag{a}$$

This expression shows that output pressure $P_L$, or line pressure, controllable by adjustment of $\lambda$ and of F, varies inversely to pressure $P_M$, so that, in case of electric failure of valve EVM causing an approximately zero pressure $P_M$, pressure $P_L$ is then maximal, so that protection of the transmission is assured.

Figure 5:
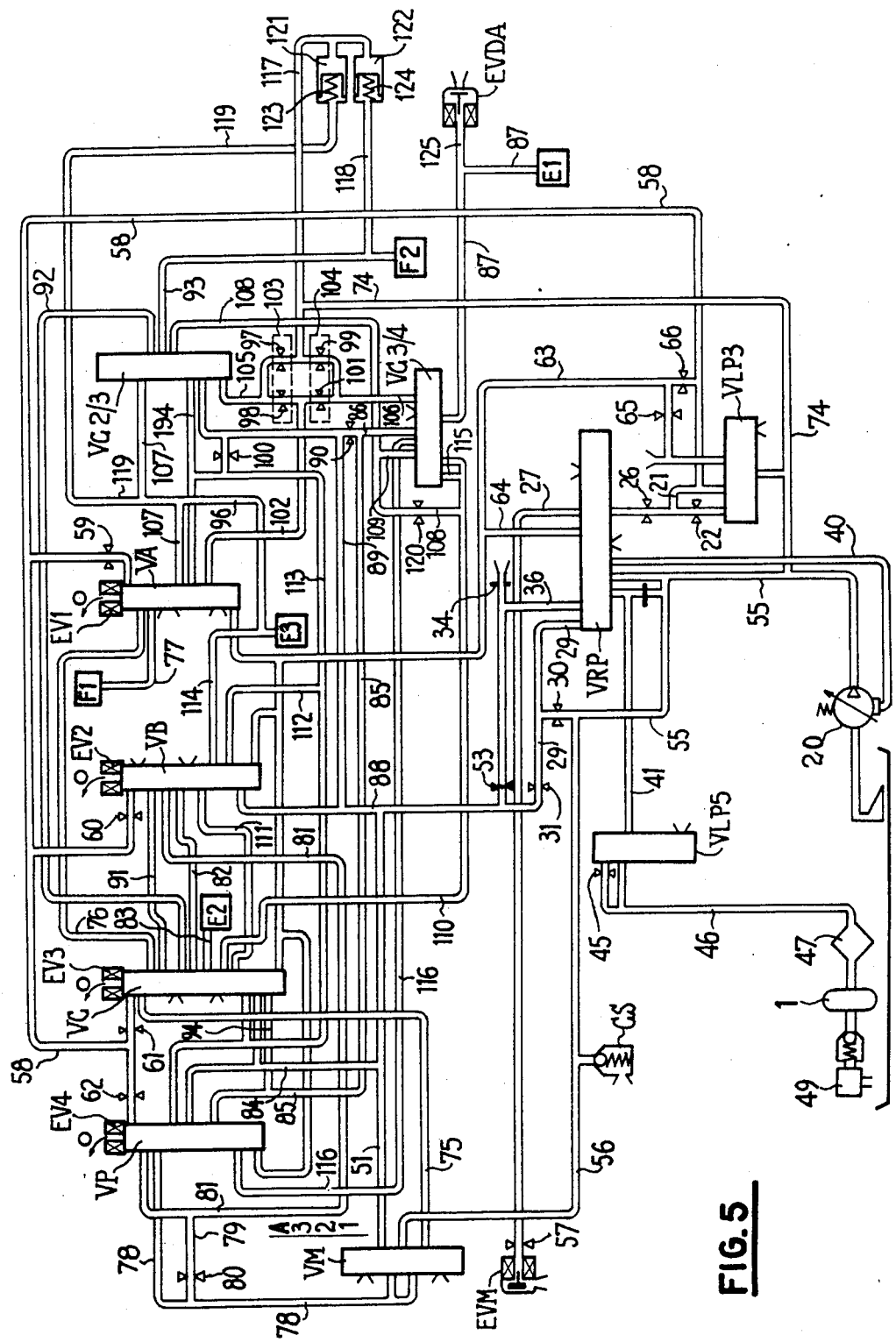
FIG. 5 diagrammatically shows the hydraulic circuit in a configuration derived from that of FIG. 4, more particularly suited to a large engined vehicle, and corresponding to positions A, 3, 2 and 1 of the selector lever.

With reference to FIG. 5, it is seen that for positions A, 3, 2 and 1 of selector lever 19, the configuration of the unit of valve VRP is similar to that just described, except that pressure $P_L$, which is no longer affected by a divider coefficient $\lambda$, acts directly on spool 28. Actually pressure $P_L$ prevails in ducts 29 and 51, thus making inoperative the hydraulic potentiometer consisting of calibrated jets 30 and 31. Moreover, jet 53 is closed and jet 34 is open with a large section at zero pressure. Chamber 7 VRP of valve VRP is always at 0, so that the equation of the equilibrium of valve VRP is written, with the same notations as above:

$$P_L = F/S - (\Sigma/s) \cdot P_M, \tag{b}$$

which shows that pressure $P_L$ is controllable by adjustment of force F, and always varies, as a safety measure, inversely to pressure PM.

Figure 5A:
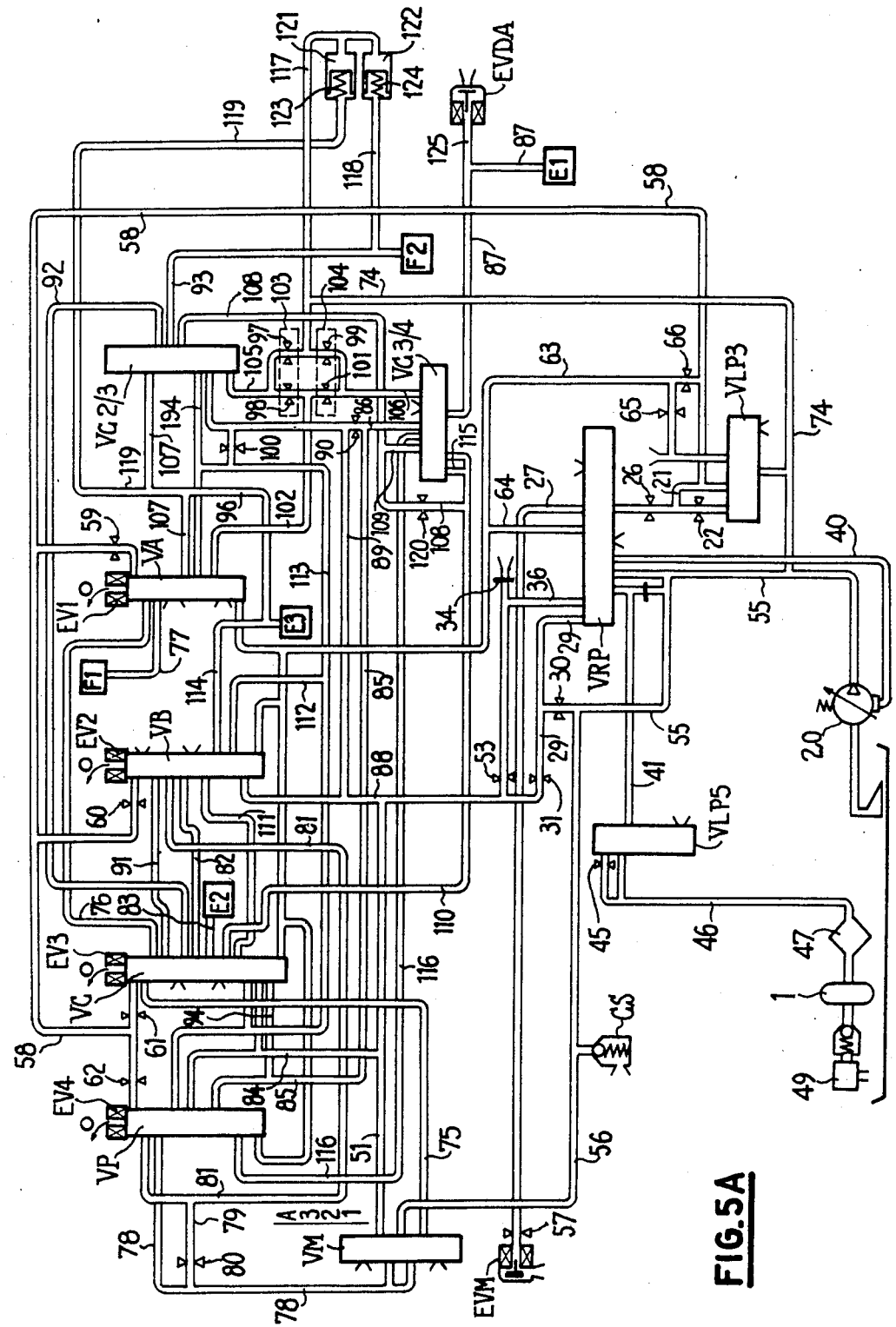
FIG. 5A diagrammatically shows the hydraulic circuit in a configuration derived from that of FIG. 5, more particularly suited to a large engined vehicle, and corresponding to positions A, 3, 2 and 1 of the selector lever.

Referring now to FIG. 5A, it can be seen that because of the opening of jet 53 and closing of jet 34, spool 28 is subjected to line pressure $P_L$ at its two ends, which neutralizes its effect, while pressure $P_L$ acts on surface S in chamber 7 VRP of valve VRP. The equation of equilibrium of valve VRP therefore is written:

$$P_L = F/S - (\Sigma/S) \cdot P_M, \tag{c}$$

This relation shows that pressure $P_L$ is controllable by adjustment of force F, and always varies, as a safety measure, inversely to pressure $P_M$.

The set of three relations (a), (b) and (c) shows that the pressure control system according to the invention makes it possible in a simple way, by control of the force of spring 37, and by calibration, selective closing and/or opening of distribution jets, to obtain three distinct line pressure ranges, making it possible to satisfy all operating configurations of the automatic transmission.

Figure 4A:
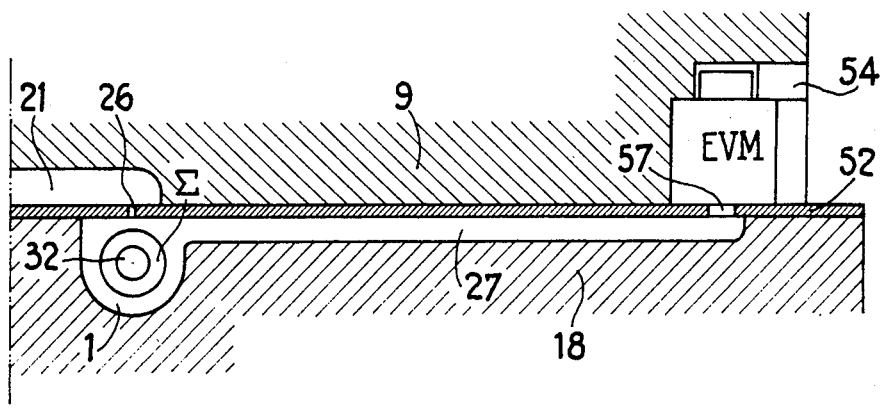
FIG. 4A shows the assembly of the modulating solenoid valve and its connection to the rest of the hydraulic network.

Referring to FIG. 4A, it will be noted that duct 27, which connects chamber 1 VRP of valve VRP to valve EVM, has an upper surface defined exclusively by distribution sheet metal piece 52, which separates hydraulic distributor unit 18 from housing 9 on which it is fastened. Valve EVM, fed hydraulic fluid by jet 57 bored through distribution sheet metal piece 52, is vertically positioned in housing 9, so that its leak flow is evacuated by orifice 54 made in the housing. This orifice 54 constitutes the high point of the hydraulic network from spool 32 of valve VRP. This arrangement favors a rapid purge of the hydraulic circuit, all the more so since an uninterrupted oil flow is established in duct 27 as soon as valve EVM is not in completely closed position.

Moreover, control of variable displacement pump 20 is achieved by land 39 of valve VRP. This land 39 is in its equilibrium position between chambers 3 VRP and 4 VRP of valve VRP. When pressure $P_L$ tends to exceed the set point defined by one of equations (a), (b) or (c) above, valve VRP has a tendency to move to the right under the action of spool 28, which communicates chamber 5 VRP of valve VRP where pressure $P_L$ prevails with chamber 4 VRP, and therefore to increase the control pressure of pump 20 prevailing in duct 40. An increase in the pressure in duct 40 causes the capacity of pump 20 to decrease, which causes a drop of line pressure $P_L$. On the contrary, when pressure $P_L$ tends to diminish, valve VRP has a tendency to move to the left under the action of spring 37, which favors putting chamber 4 VRP in communication with chamber 3 VRP, itself set at 0. There is consequently a drop in the pressure prevailing in duct 40, which makes the capacity of pump 20 increase, which causes a rise in line pressure $P_L$.

Further, a flow of hydraulic fluid at line pressure $P_L$ is transferred to duct 41, by going through chamber 5 VRP to chamber 6 VRP, which makes it possible to feed pressure control valve VLP 5. This valve VLP 5, identical to pressure control valve VLP 3, also operates in an identical way. Valve VLP 5 includes a spool 44, which defines, together with the body of said valve, four chambers referenced upward as 2, 3, 4, 5 VLP 5. A spring 43 acts to bias spool 44.

The pressure controlled on the lip of chamber 4 VLP 5 by land 42 of spool 44 and prevailing in duct 46, is sent through a damping jet 45 on the end of spool 44 in chamber 5 VLP 5, thus balancing the thrust of spring 43 on the other end of spool 44.

The pressure thus controlled, whose value $P_C$ is fixed by the force of spring 43, serves for feeding in series heat exchanger 47, hydrokinetic torque converter 1, and lubricating circuit 49 of the transmission. This device makes it possible to protect heat exchanger 47 and torque converter 1 against an excessive pressure level which would damage them, regardless of the line pressure level $P_L$ required for good running of the transmission.

Moreover, when there is a sudden drop of line pressure $P_L$, due, for example, to a large flow draw caused by filling of a hydraulic receiver, valve VRP moves to the left under the action of spring 37, which enables bearing surface 50 of spool 32 of valve VRP momentarily to close the passage between chambers 5 VRP and 6 VRP. This action cuts off the flow going to exchanger 47, torque converter 1 and lubricating circuit 49. Reduction of the flow caused by the momentary cutoff of the flow through exchanger 47, torque converter 1 and circuit 49 enables line pressure $P_L$ to regain its set point more quickly and thus to perform the filling of the hydraulic receiver under better conditions.

The various distribution valves of the hydraulic fluid all include a spool of symmetrical design, which, with the body of each distributor, delimits various chambers.

Sequence valve VA has a spool 127 (FIG. 30), which delimits chambers referenced downward 1, 2, 3, 4, 5, 6, 7, 8, 9 VA.

Sequence valve VB has a spool 128 (FIG. 29), which delimits chambers referenced downward 1, 2, 3, 4, 5, 6, 7, 8, 9, 10, 11 VB.

Sequence valve VC has a spool 129 (FIG. 28), which delimits chambers referenced downward 1, 2, 3, 4, 5, 6, 7, 8, 9, 10, 11, 12, 13, 14, 15 VC.

Progressiveness valve VP has a spool 130 (FIG. 27), which delimits chambers referenced downward 1, 2, 3, 4, 5, 6, 7, 8 VP.

Cutoff valve VC 2/3 has a spool 131 (FIG. 31), which delimits chambers referenced downward 1, 2, 3, 4, 5, 6, 7 VC 2/3.

Cutoff valve VC 3/4 has a spool 132 (FIG. 32), which delimits chambers referenced from right to left 1, 2, 3, 4, 5, 6, 7, 8 VC 3/4.

Manual valve VM has a spool 126 (FIG. 33), which delimits chambers referenced downward 1, 2, 3, 4, 5, 6, 7 VM.

There will now be described the mode of operating the four spools 127, 128, 129 and 130 of the three sequence valves VA, VB, VC and of progressiveness valve VP, which are associated with solenoid valves EV1, EV2, EV3 and EV4. The controlled reference pressure $P_1$, which prevails in duct 21, is brought by duct 58 into chambers 1 of valves VA, VB, VC and VP, respectively through damping jets 59, 60, 61 and 62. All chambers 1 of these valves communicate with the fluid duct of solenoid valves EV1, EV2, EV3 and EV4. Moreover, the hydraulic potentiometer, made up of calibrated jets 65 and 66 and connected in the bypass between duct 58 where reference pressure $P_1$ prevails, and 0, creates in duct 63 an intermediate reference pressure $P_2$. This intermediate reference pressure $P_2$ has a value approximately equal to half of that of reference pressure $P_1$. This pressure $P_2$ is brought by duct 63 to the last chambers of valves VA, VB, VC, VP, i.e., to chambers 9 VA, 11 VB, 15 VC and 8 VP. Moreover, pressure $P_2$ is brought, by a bypass duct 64 from duct 63, into chamber 2 VRP to balance the leaks going from chamber 1 VRP, where pressure $P_M$ prevails, to chamber 3 VRP, which is at 0, between situations where pressure $P_M$ is equal to $P_1$, and where $P_M$ is approximately zero.

Under these conditions, the operation of any of the fours spools 127, 128, 129 and 130 of valves VA, VB, VC and VP is the following: when a solenoid valve EVi (i=1 to 4) is excited (ball down in Figures), the duct of the solenoid valve is closed and pressure $P_1$ is exerted on the end of the spool facing solenoid valve EVi, while pressure $P_2$ is applied at the other end. Since pressure $P_2$ is equal to approximately half of pressure $P_1$, and since the section of the spool is constant, this latter takes a stop position remote from solenoid valve EVi. On the other hand, when solenoid valve EVi is at rest (ball up in Figures), the solenoid duct is open and the pressure that is exerted on the spool facing solenoid valve EVi is approximately zero, while pressure $P_2$ is always applied on the other end. For this reason, the spool comes to strike the back of solenoid valve EVi. It should be noted that the flow rate of the hydraulic potentiometer constituted by jets 65 and 66 creates a flow in the controlled pressure circuit at pressure $P_1$, even if all solenoid valves EVi are closed, which improves the operation of controlling of pressure control valve VLP 3.

Figure 5B:
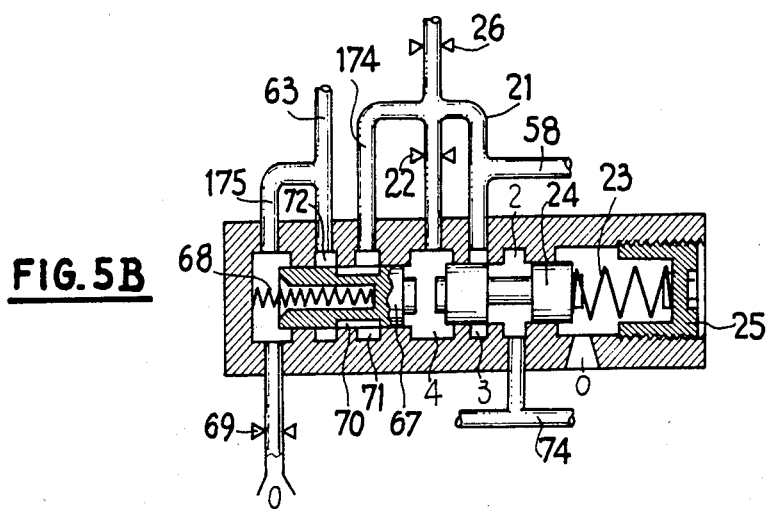
FIG. 5B shows a variant of the system for generating the intermediate pressure starting from the reference pressure.

An alternative arrangement for generating of pressure $P_2$ is shown by FIG. 5B. The bore of valve VLP 3 having section S2 is extended so that it can receive an additional control spool 67. The body of this spool is hollow so that a return spring 68, calibrated at a force F', can be housed therein. Pressure $P_1$, present in chamber 4 VLP 3 is also common to chamber VLP 3 and chamber 71 of 67. Pressure $P_1$ acts on the right end of this spool 67. Moreover, pressure $P_1$ is introduced by a duct 174, which connects to duct 21, in chamber 71 of spool 67. The diameter of the body of spool 67 is reduced at chamber 71 to form a cylindrical narrowing 70, thus creating, at right angles to chamber 72, a control lip making it possible to generate pressure $P_2$ in chamber 72 and consequently in duct 63 already defined. Pressure $P_2$ is brought back by duct 175 into chamber 73, so that the equilibrium equation of spool 67 is written:

$$P_2 \cdot S_2 + F = P_1 \cdot S_2, \text{ or } P_2 = P_1 - F/S_2 \qquad (d)$$

Finally, chamber 73 is connected to 0 (zero pressure) by a small-diameter jet 69 bored in distribution sheet metal piece 52. This makes it possible to create a constant control flow favorable to a good operation of spools 24 and 67. The control unit constituted by spool 67 and its associated chambers takes place of the pressure divider defined by calibrated jets 65 and 66, and is connected to the rest of the hydraulic circuit by ducts 21, 58, 63 and 74, already mentioned.

It will be noted that control of the four spools 127, 128, 129 and 130 of the three sequence valves VA, VB, VC and of progressiveness valve VP is performed entirely hydraulically and by the sole action of solenoid valves EV1, EV2, EV3 and EV4, which do or do not allow a flow leak to pass. The various spools 127, 128, 129 and 130 are not subjected to the action of any spring, which considerably simplifies assembly, and makes their operation reliable. Moreover, it will be noted that the various spools, all symmetrical, can be assembled in either direction, which makes it possible to simplify assembly operations during which it is not necessary to check on the orientation of the spools.

There will now be described shiftings of the gears, all of which proceed from the same basic principle, with the exception that will be explained in due course. During shifting, filling of a hydraulic receiver which becomes active during shifting, is performed first through a jet with a large passage section in parallel with a jet with a small passage section, which essentially corresponds to a play take-up phase. Feeding is then done through the sole jet with a small passage by stopping of the feed circuit through the jet with the large passage section, which corresponds to a controlled torque engagement phase. Finally, feeding is done again through the jet with the large passage section in parallel with the jet with a small passage section, which corresponds to a safety locking. It will be seen below that this last phase is systematically achieved by the return to position 0 of valve VP (valve EV4 not excited), which constitutes a safety measure in case of possible electrical failure of solenoid valve EV4.

Figure 6:
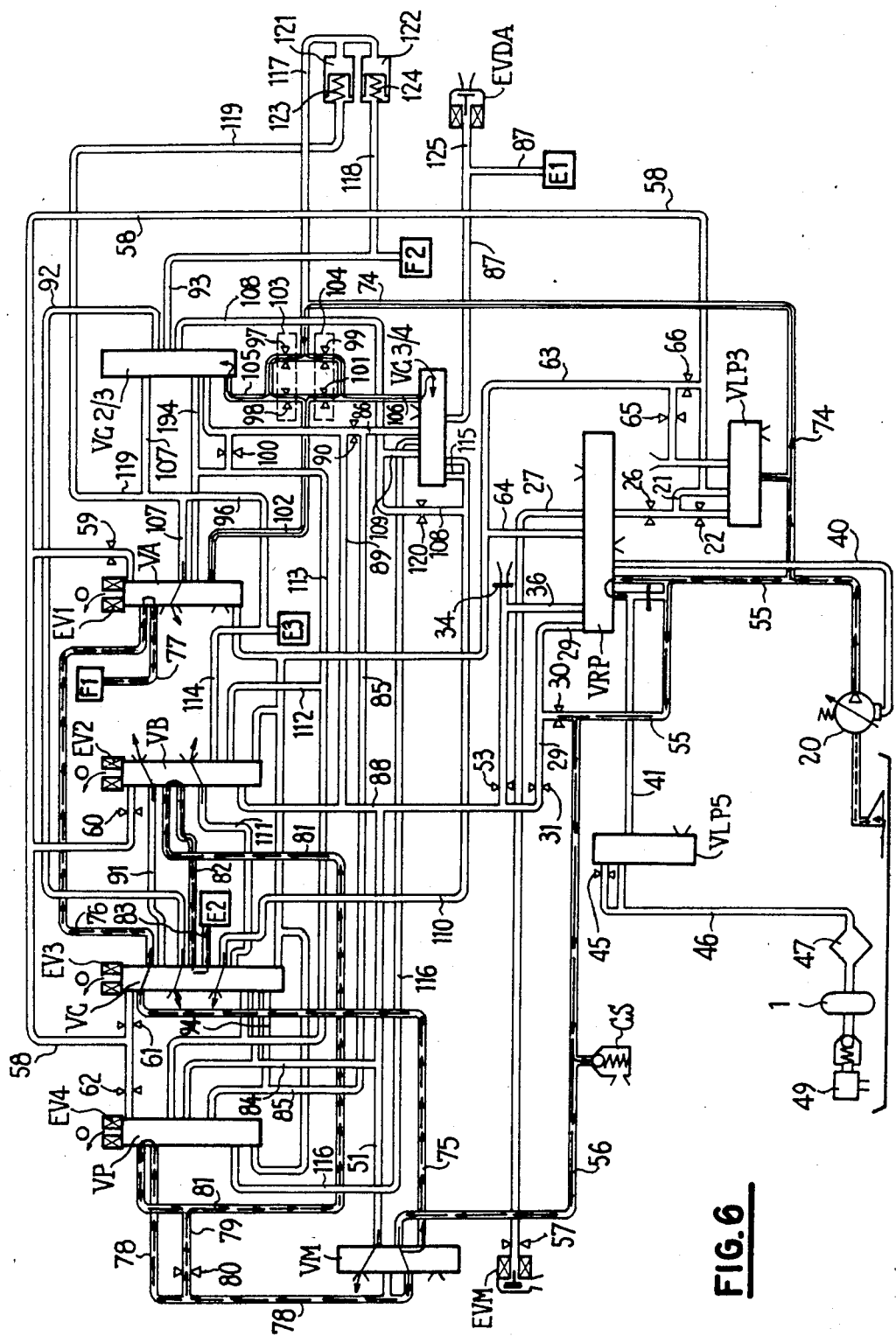
FIG. 6 shows the configuration of the hydraulic circuit for the first transitory phase of a neutral-reverse shift, and for the stable state of reverse gear.
Figure 2:
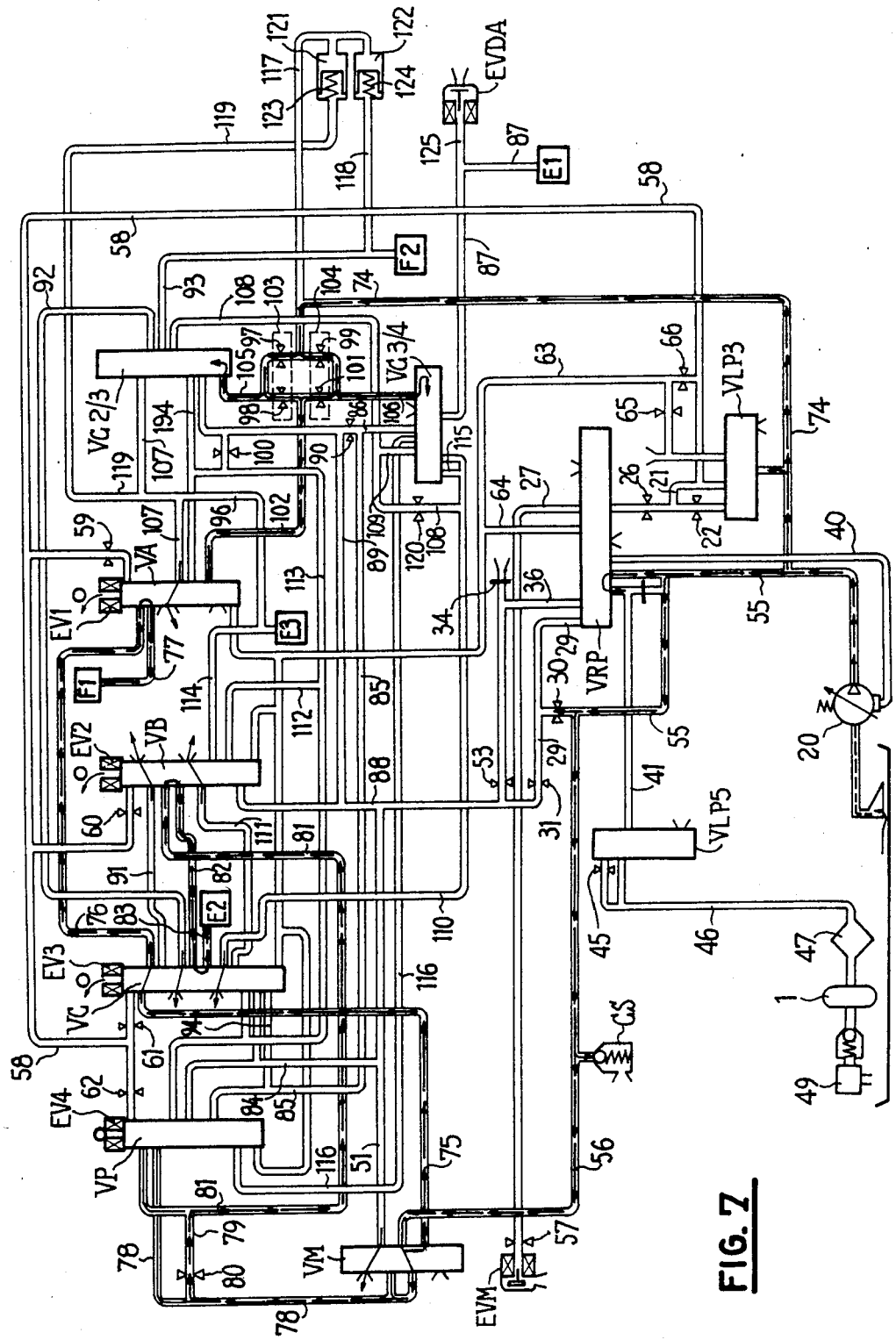

Shifting from neutral position N to reverse R is shown in FIGS. 6 and 7. Movement of manual valve VM from position N to position R (FIG. 33) allows the hydraulic fluid, present under pressure $P_L$ in duct 56, to feed duct 75 by going from chamber 4 VM to chamber 6 VM of valve VM, and to enter chamber 2 VC of valve VC. Spool 129 of valve VC being in position 0, chambers 2 VC and 3 VC of valve VC are in communication, so that duct 76, which connects chamber 3 VC of valve VC to chamber 2 VA of valve VA (in position 0), is put under pressure. Since valve VA is in position 0, chambers 2 VA and 3 VA are in communication, which allows brake $F_1$ to be fed by duct 77; consequently, brake $F_1$ is fed through the equivalent of a jet with a large passage section, since no jet with a small passage section is inserted in the feed circuit.

Moreover, manual valve VM in position R puts its chambers 4 VM and 5 VM in communication, so that duct 81 is fed in parallel, on the one hand, through chambers 2 VP and 3 VP of valve VP in position 0 and, on the other hand, through calibrated jet 80 inserted in duct 79 connected in parallel between ducts 78 and 81. Finally, feeding of clutch $E_2$ from duct 81 is performed though chambers 4 VB and 5 VB of valve VB in position 0, duct 82, chambers 7 VC and 8 VC of valve VC, and finally duct 83. Since calibrated jet 80 affects only a duct in parallel on the feed circuit of $E_2$, clutch $E_2$ is consequently fed through the equivalent of a jet with a large passage section with, in parallel, a calibrated jet 80 with a small passage section.

The start of the second phase (FIG. 7) of the shift from neutral N to reverse R is marked by the movement into position 1 of spool 130 of valve VP under the effect of closing of solenoid valve EV4.

As a result, the communication between chambers 2 VP and 3 VP of valve VP is interrupted, so that duct 81 is no longer fed through jet 80 with a small passage section. Consequently, since the rest of the circuits are not affected by the movement swing of spool 130 of valve VP, filling of clutch $E_2$ is done from now on through only calibrated jet 80 of small passage section. The locking phase is initialized when spool 130 of valve VP again swings back to position 0, thus reestablishing the feed of clutch $E_2$ through a passage equivalent to a large section, as during the first phase shown in FIG. 6.

Figure 8:
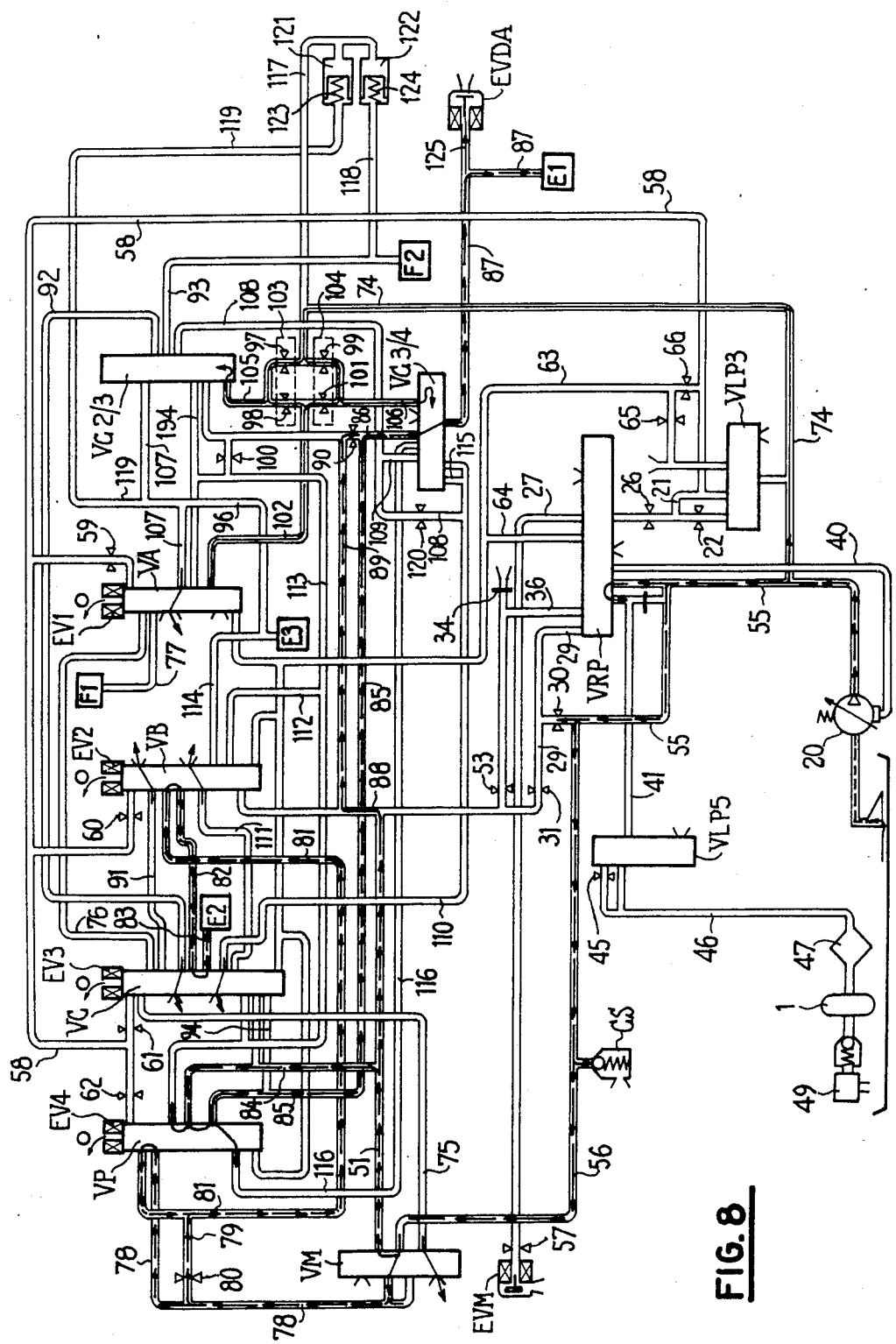
FIG. 8 shows the configuration of the hydraulic circuit for the stable state of the hydraulic third gear (3H)

The stable state of forward hydraulic third gear, shown in FIG. 8 and referenced 3H will now be considered. This hydraulic third can be either a forward emergency state in case of failure of the control system of solenoid valves EVi (i=1–4), or a normal forward gear, which can be reached from the mechanical third gear (3M) under the particular conditions of the vehicle, as will be seen below. With manual valve VM in position A, line pressure $P_L$ is available in chambers 2 VM and 3 VM, from chamber 4 VM. Feeding of clutch $E_1$ from chamber 2 VM of valve VM is done through duct 51, duct 84, chambers 5 VP and 6 VP, duct 85, duct 86, chambers 3 VC 3/4 and 4 VC 3/4 of valve VC 3/4 in position 0, and finally duct 87. On the other hand, feeding of clutch $E_1$ is done in parallel by duct 88, duct 89, and through calibrated jet 90 of small passage section inserted in parallel between ducts 85 and 89. Moreover, feeding of clutch $E_2$ is done from chamber 3 VM of valve VM through the same circuit as for its feeding in reverse position R, in locking phase. Thus in established hydraulic third gear 3H, clutches $E_1$ and $E_2$ are fed by circuits equivalent to jets with large passage sections.

Figure 9:
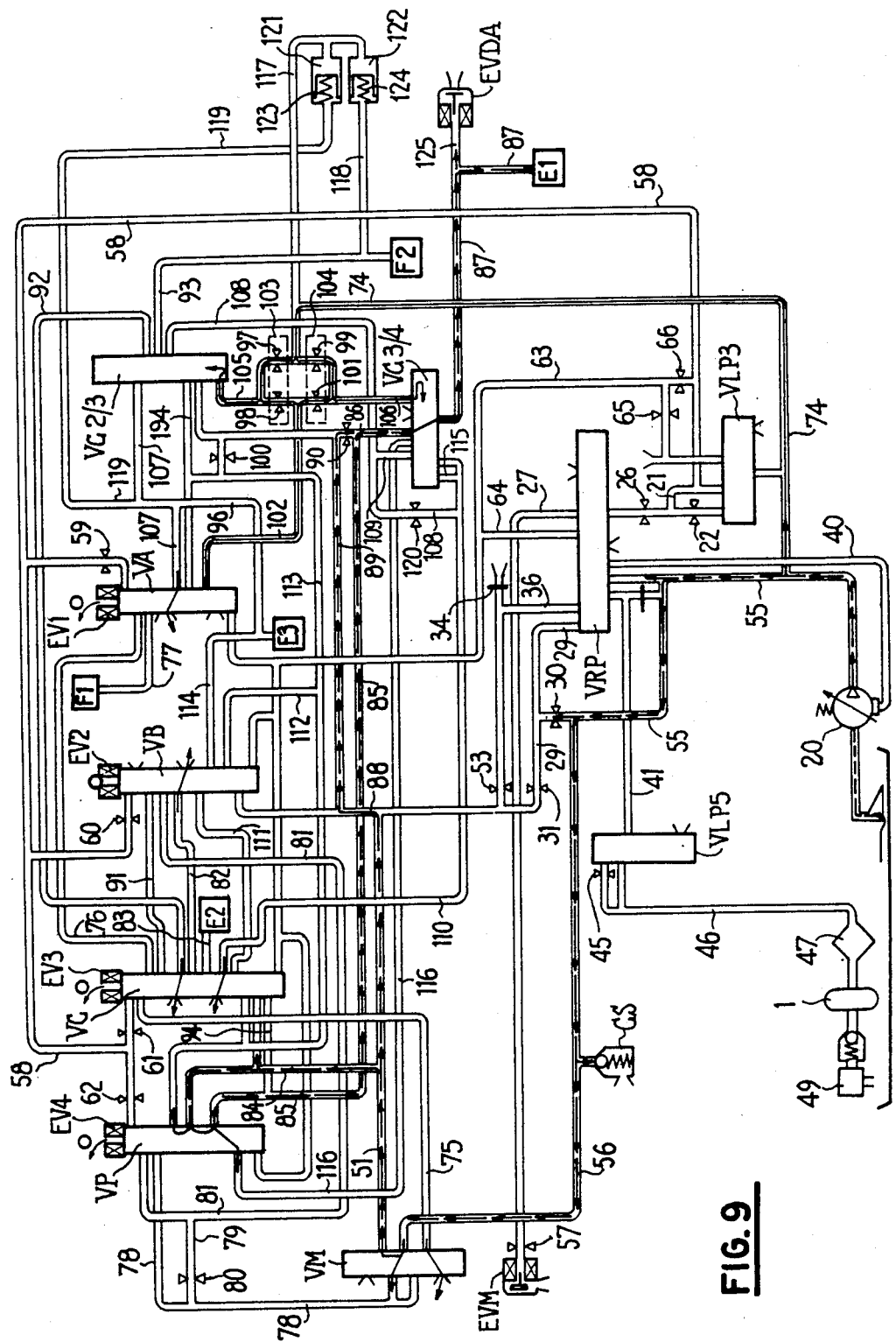
FIG. 9 shows the configuration of the hydraulic circuit for the first transitory phase of a shift of neutral-hydraulic first gear (1H), as well as for the stable state of hydraulic first gear.

Shifting from neutral position N to forward hydraulic first gear position (1H) will now be examined. The first phase of this shift is shown in FIG. 9. With manual valve VM in position A, feeding of clutch $E_1$ is done through the same circuit as that described for feeding of clutch $E_1$ in hydraulic third (3H).

Figure 10:
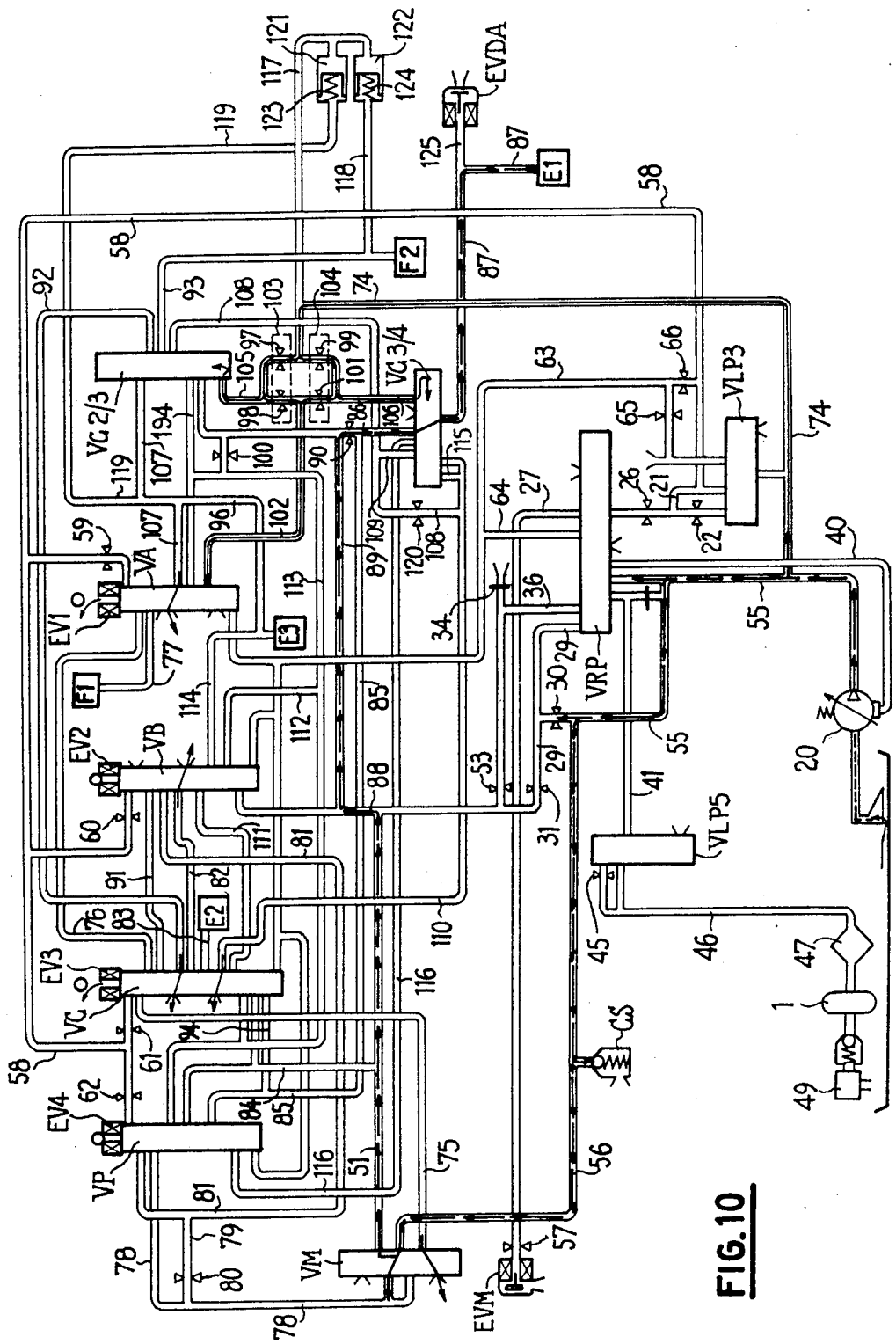
FIG. 10 shows the configuration of the hydraulic circuit for the second transitory phase of a shift of neutral-hydraulic first gear (1H)

The start of the second phase of shifting from neutral to hydraulic first gear (1H) is shown in FIG. 10. The start of this second phase is marked by swinging of valve VP into position 1, caused by the closing of solenoid valve EV4. Thereby, the communication between chambers 5 VP and 6 VP of valve VP is then cut off, which causes stopping of feeding of clutch $E_1$ by duct 85, and allows only feeding of clutch $E_1$ through calibrated jet 90 of small passage section. The locking phase is initialized by swinging of valve VP back to position 0, which reestablishes feeding in large passage section of clutch $E_1$ by duct 85 through chambers 5 VP and 6 VP of valve VP.

Figure 11:
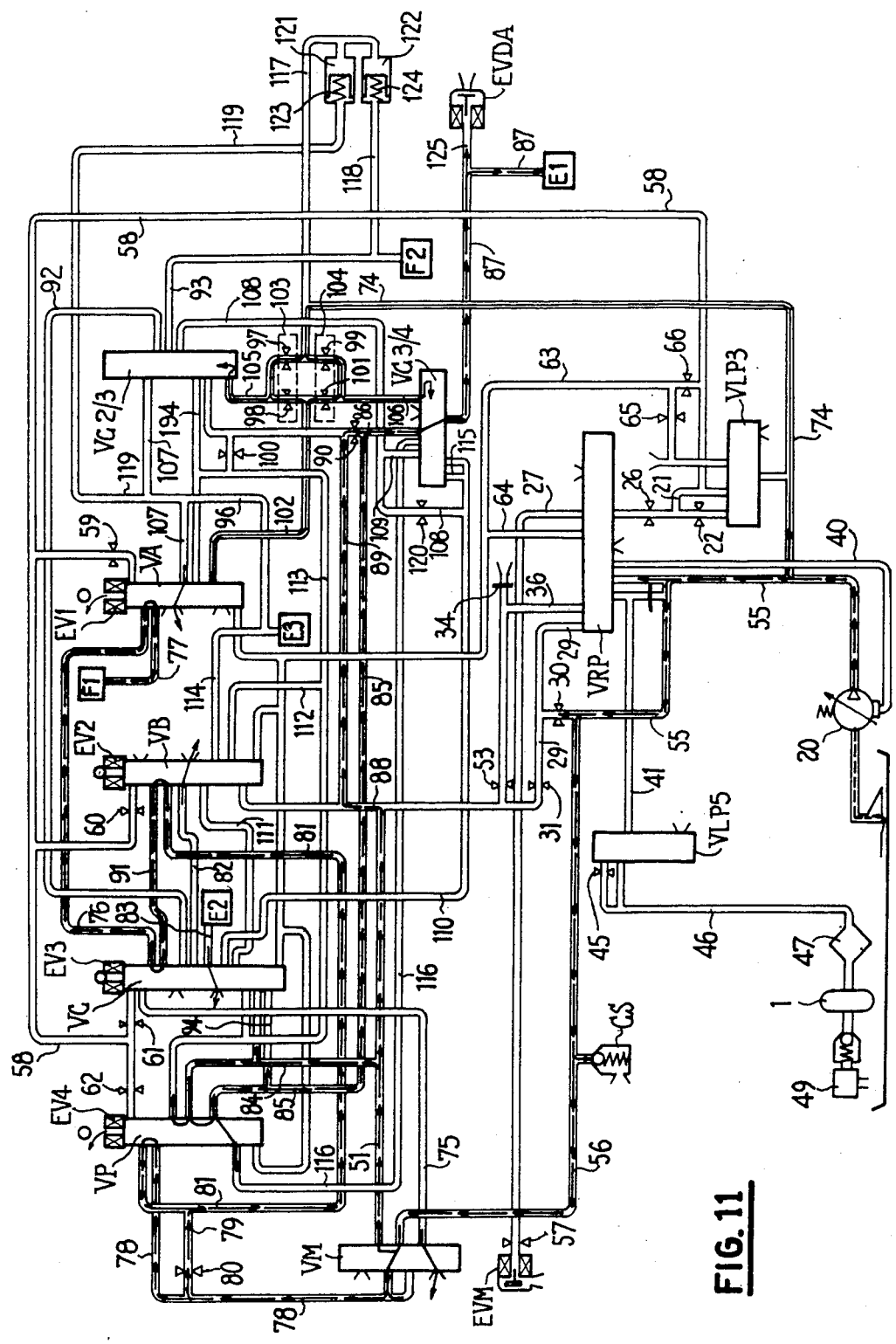
FIG. 11 shows the configuration of the hydraulic circuit for the first transitory phase of a shift of hydraulic first gear (1H)-hydraulic first gear with engine brake (1HFM), as well as for the stable state of hydraulic first gear with engine brake (1HFM)
Figure 12:
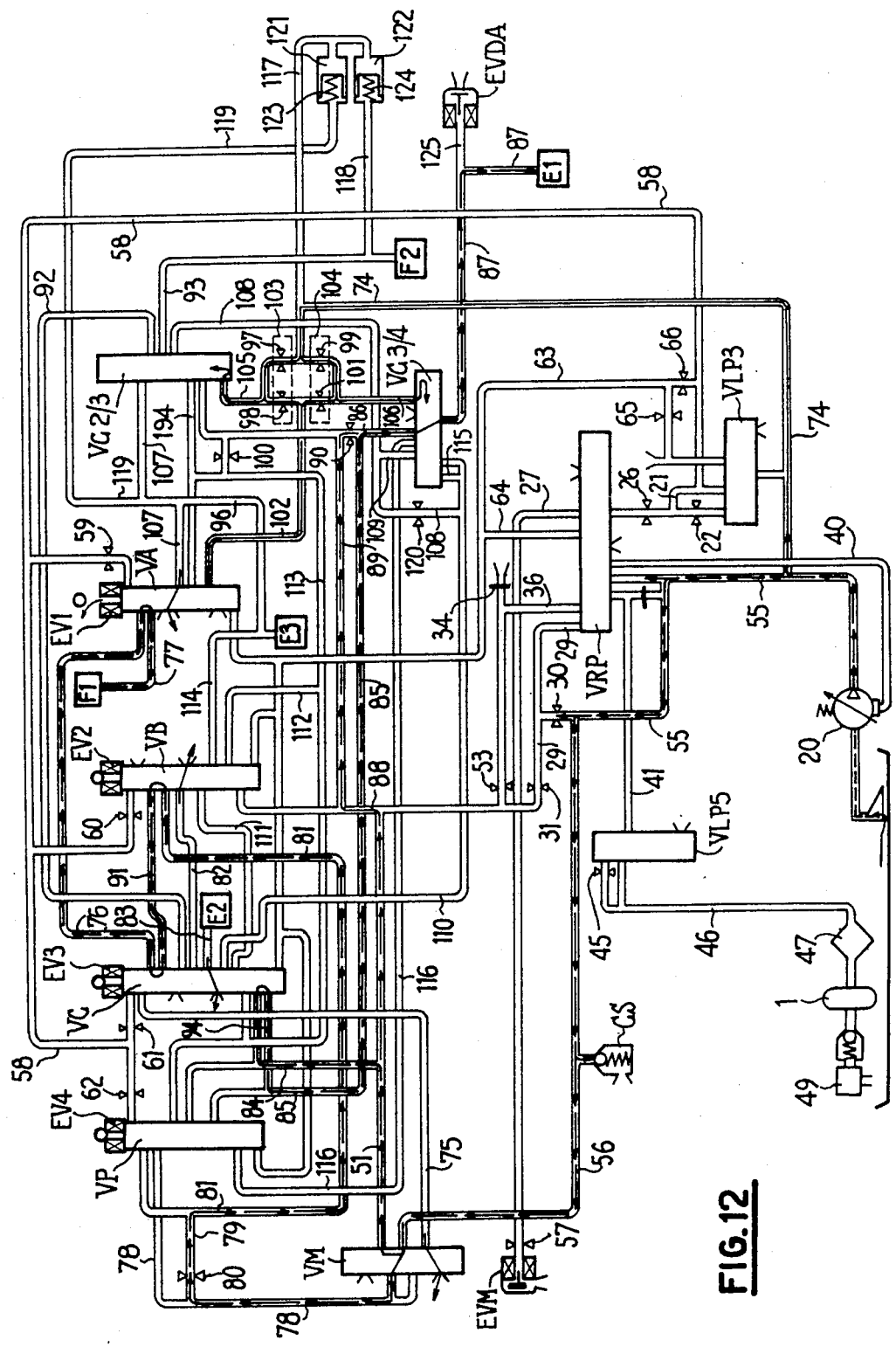
FIG. 12 shows the configuration of the hydraulic circuit for the second transitory phase of a shift of hydraulic first gear (1H)-hydraulic first gear with engine brake (1HFM)

Shifting from forward hydraulic first gear (1H) to forward hydraulic first gear with engine brake (1HFM) is shown in FIGS. 11 and 12. FIG. 11 is to be consulted for the first phase of the shift from hydraulic first (1H) to hydraulic first with engine brake (1HFM). This first phase is marked by the transition from state (0100) of EVi (i=1–4) to the state (0110) as indicated in FIG. 3A. In this case, feeding of clutch $E_1$ is done by the same circuit as for the locking phase of hydraulic first (1H). Feeding of brake $F_1$ is done by duct 81, which is fed in parallel by ducts 78 and 79 through chambers 2 VP and 3 VP of valve VP in position 0, then through chambers 4 VB and 3 VB of valve VB in position 1 by duct 91 through chambers 4 VC and 3 VC of valve VC also in position 1 by duct 76 and finally by chambers 2 VA and 3 VA of valve VA in position 0 and duct 77. In this first phase, clutch $E_1$ and brake $F_1$ are fed by circuits equivalent to jets with large passage section, brake $F_1$ further being fed by jet 80 of small passage section, in parallel between ducts 78 and 81.

Upon swinging of spool 130 of valve VP into position 1 which corresponds to the start of the second phase shown in FIG. 12, communication is cut off between chambers 2 VP and 3 VP of valve VP. Thereby, feeding of brake $F_1$ is assured only through calibrated jet 80 of small passage section, the feed circuit of clutch $E_1$, moreover, remaining unchanged and equivalent to a jet with large passage section. As above, the locking phase is initialized by swinging back to position 0 of valve VP, which reestablishes communication between chambers 2 VP and 3 VP, and refeeds brake $F_1$ by the same circuit as in the first phase.

Figure 13:
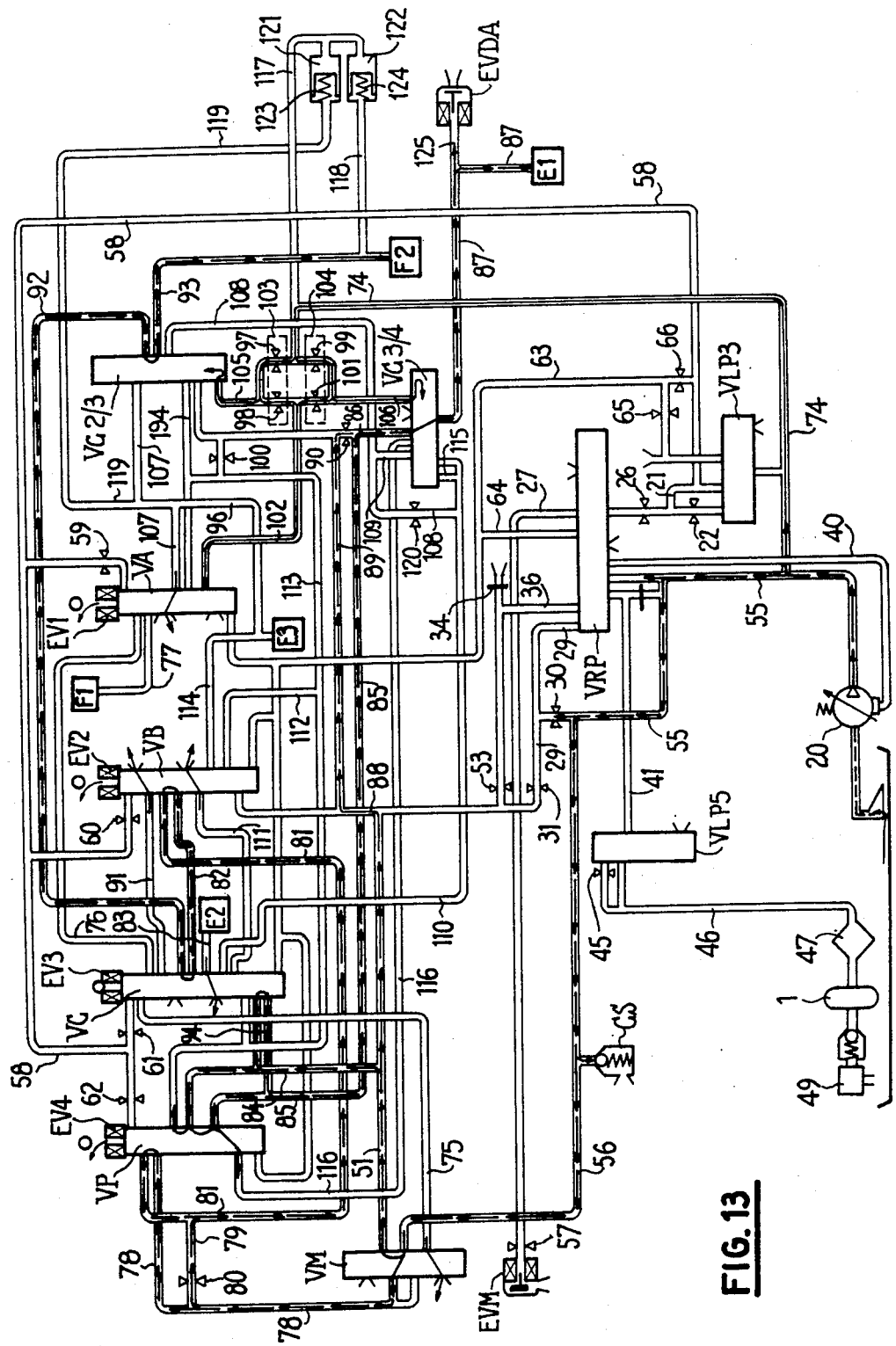
FIG. 13 shows the configuration of the hydraulic circuit for the first transitory phase of a shift of hydraulic first gear (1H)-hydraulic second gear (2H) as well as for the state of the hydraulic second gear (2H)
Figure 14:
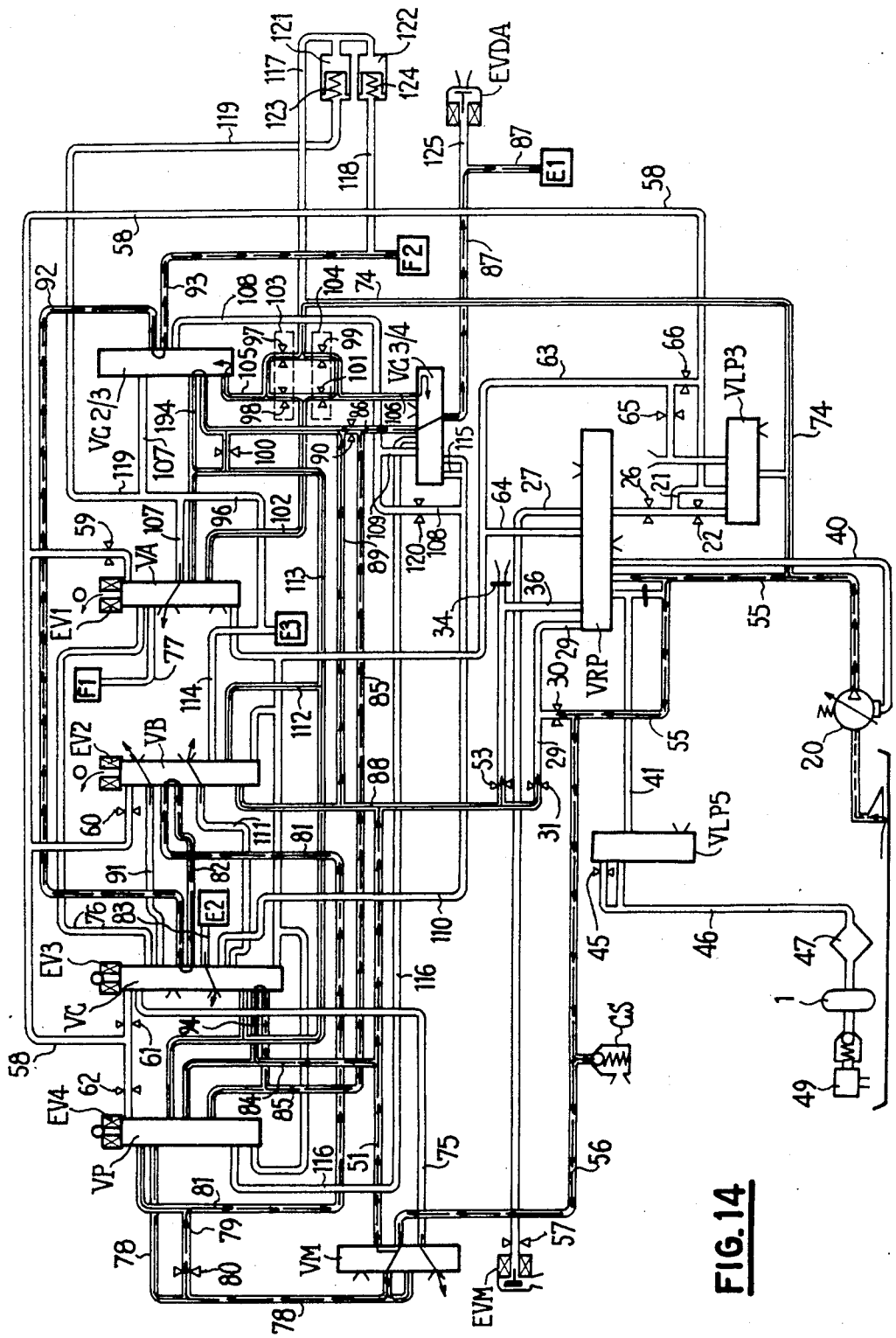
FIG. 14 shows the configuration of the hydraulic circuit for the second transitory phase of a shift of hydraulic first gear (1H)-hydraulic second gear (2H)

Shifting of forward hydraulic first gear (1H) to forward hydraulic second gear (2H) is shown in FIGS. 13 and 14. The first phase of a shift from hydraulic first gear (1H) to hydraulic second gear (2H), which is shown in FIG. 13, is marked by the transition from state 0100 of EVi (i=1-4) to state 0010. Feeding of clutch $E_1$ is always assured in large passage section by the same circuit as in locking phase of the hydraulic first state (1H). Feeding of brake $F_2$ is done by duct 81, which is fed in parallel by ducts 78 and 79 through chambers 2 VP and 3 VP of valve VP in position 0, then through chambers 4 VB and 5 VB of valve VB in position 0, then by duct 82, chambers 7 VC and 6 VC of valve VC in position 1, duct 92, chambers 2 VC 2/3 and 3 VC 2/3 of valve VC 2/3 in position 0, and finally by duct 93. In the last phase, clutch $E_1$ like brake $F_2$ is fed by circuits equivalent to jets with large passage sections.

The second phase of a shift from hydraulic first gear (1H) to hydraulic second gear (2H) is shown in FIG. 14. Start of this second phase is caused by closing of solenoid valve EV4, i.e., EVi (i=1-4) are in state 0011. This results in the swinging of valve VP to position 1. Thereby, communication between chambers 2 VP and 3 VP of valve VP is stopped, so that feeding of brake $F_2$ is limited by jet 80 of small passage section, the feed circuit of clutch $E_1$, moreover, remaining unchanged and equivalent to a jet with large passage section. As above, the locking phase is initialized by swinging of valve VP back to position 0, which reestablishes communication between chambers 2 VP and 3 VP of valve VP, and refeeds brake $F_2$ by the same circuit as in the first phase, i.e., in large passage section.

Shifting of forward hydraulic second gear (2H) to forward mechanical third gear (3M) is shown in FIGS. 15, 16, 17 and 18. Shifting of hydraulic second gear (2H) to mechanical third gear (3M) is actually performed in two stages: by referring to the table of FIG. 3, it can be seen that to make a shift directly from hydraulic second (2H) to forward mechanical third (3M) it would be necessary simultaneously to fill clutches $E_2$ and $E_3$, while emptying brake $F_2$ just at the moment of switching of planetary gear train 2. Now, simultaneously filling of two receivers causes a momentary flow draw of hydraulic fluid so that line pressure $P_L$ would be greatly disturbed, and the filling could not be performed under satisfactory and controlled conditions. Further, the rise in pressure in clutches $E_2$ or $E_3$ being poorly controlled, there would be ambiguity in regard to the clutch which triggers the switching and, consequently, in regard to the one whose filling should trigger emptying of brake $F_2$. To get around this difficulty, first a shift is made from hydraulic second gear (2H) to forward third gear in a first power division configuration (3 DP) by filling clutch $E_3$. When this shift is finished, it is completed by a "bridging" by means of clutch $E_2$, thus locking planetary gear train 2 which then turns as a single block.

Figure 15:
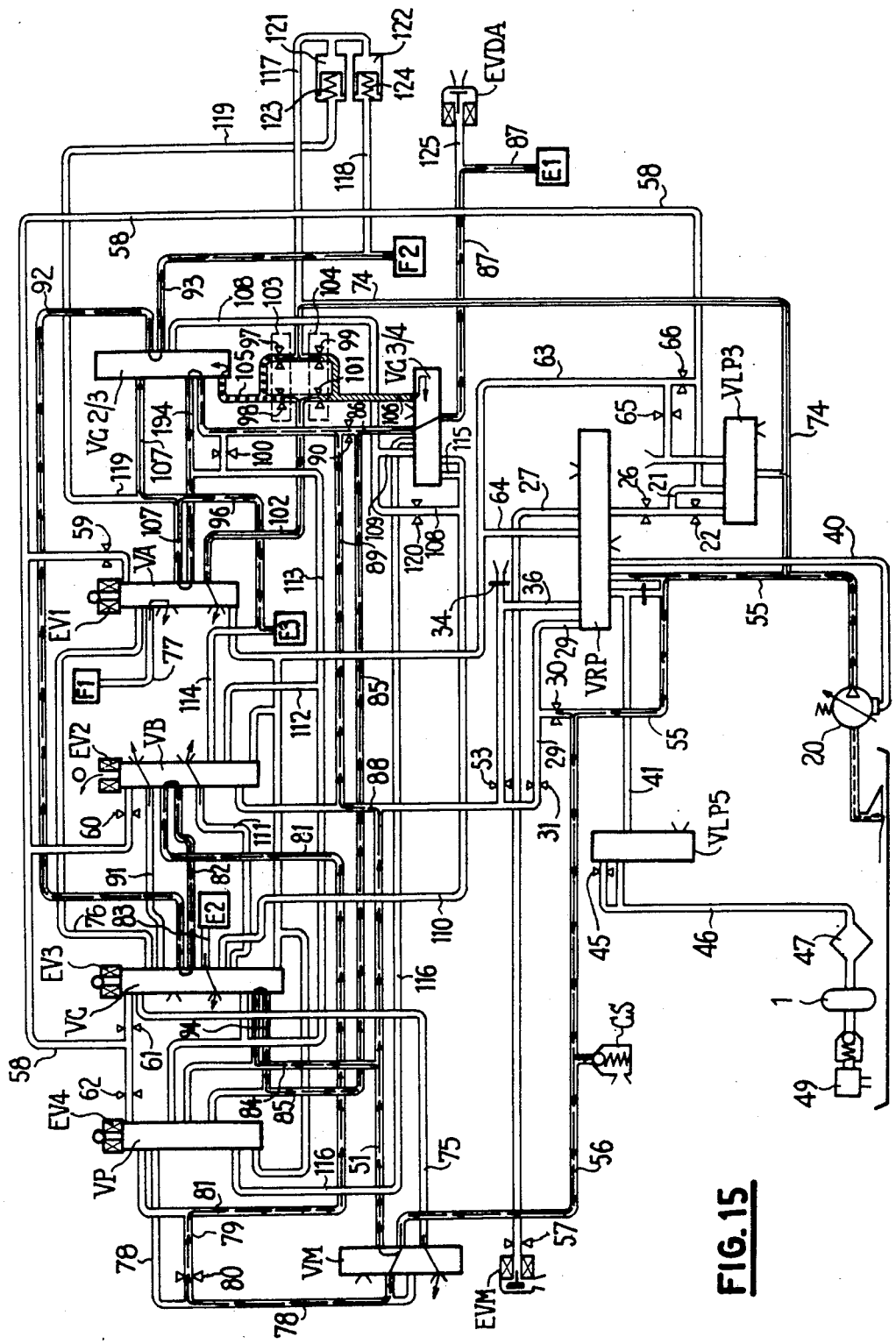
FIG. 15 shows the configuration of the hydraulic circuit for the first transitory phase of a shift of hydraulic second gear (2H)-mechanical third gear (3M)

FIG. 15 shows the first phase of shifting from hydraulic second (2H) to mechanical third (3M), initialized by change of state of solenoid valves EVi (i=1-4), which go from state 0010 to state 1011. Clutch $E_1$ remains fed by the large passage section from chamber 2 VM of valve VM, by duct 51, duct 84, chambers 13 VC and 14 VC of spool VC which is in position 1, duct 94, duct 85, duct 86, chambers 4 VC 3/4 and 3 VC 3/4 of valve VC 3/4, and finally duct 87. Feeding of brake $F_2$ is then performed in a small passage section, which does not present any drawback, since during shifting from hydraulic second (2H) to mechanical third (3M), the torque transmitted by brake $F_2$ keeps on diminishing until it is cancelled. Feeding of this brake $F_2$ is done from chamber 2 VM of valve VM by following the same network as that followed during the second phase of the shift from hydraulic first (1H) to hydraulic second (2H), which is shown in FIG. 14. Clutch $E_3$ is put under pressure from chamber 2 VM of valve VM, by duct 51, duct 88, duct 89, chambers 6 VC 2/3 and 5 VC 2/3 of valve VC 2/3 in position 0. Feeding of clutch $E_3$ is also done in parallel by jet 100 of small passage section, duct 94, chambers 5 VA and 6 VA of valve VA in position 1 and duct 96.

The first phase of the shift from hydraulic second (2H) to mechanical third (3M) is also characterized by activation of hydraulic potentiometers 103 and 104, which are constituted, respectively, by calibrated jets 97 and 98, on the one hand, and by calibrated jets 99 and 101, on the other hand. These potentiometers 103 and 104 are fed by duct 74, where line pressure $P_L$ prevails and are set at 0 by duct 102, which comes out in chamber 7 VA of valve VA, which can be in communication with chamber 8 VA, itself at 0, only if valve VA is in position 1. Now, for all states 1 to 14 indexed in the last column on the right of the table of FIG. 3A (the various states can also be indexed by the state of the various solenoid valves EVi), valve VA is in position 0, so that hydraulic potentiometers 103 and 104 are inactive, which makes it possible to economize on their leak flow for the gears for which they are not used.

For the states 15 and following (FIG. 3A), which correspond to the various configurations linked to third and fourth gears, potentiometers 103 and 104 are activated. In this case potentiometer 103 gives a pressure $P_3$ equal to a fraction of line pressure $P_L$, which is determined by the ratio of the sections of jets 97 and 98. This pressure $P_3$ is applied in chamber 7 VC 2/3 of valve VC 2/3 by means of duct 105. Also potentiometer 104 gives a pressure $P_4$ equal to a fraction of line pressure $P_L$, which is determined by the ratio of the sections of jets 99 and 101. This pressure $P_4$ is applied in chamber 1 VC 3/4 of cutoff valve 3/4 by means of duct 106.

Figure 16:
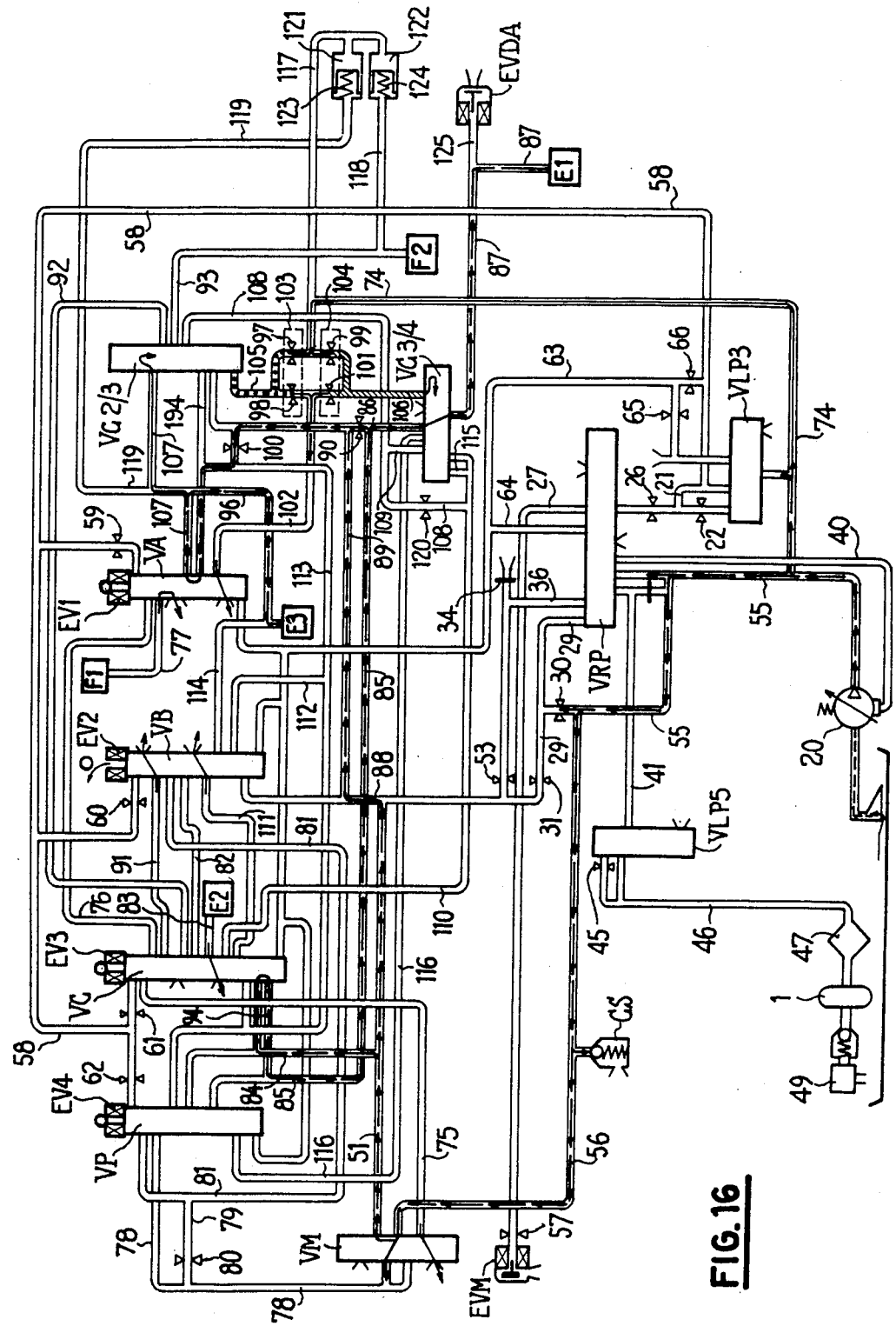
FIG. 16 shows the configuration of the hydraulic circuit for the second transitory phase of a shift of hydraulic second gear (2H)-mechanical third gear (3M)

The second phase of shifting from hydraulic second (2H) to mechanical third (3M) is shown in FIG. 16. This second phase of shifting gears is triggered by swinging of cutoff valve VC 2/3, which operates in the following way: when the feed pressure of clutch $E_3$, which is also introduced by duct 107 into chamber 1 VC 2/3 of cutoff valve VC 2/3, i.e., on the end of spool 131, exceeds value $P_3$, cutoff valve VC 2/3 swings into position 1. This swinging causes, on the one hand, emptying of brake $F_2$ by duct 93, chambers 3 VC 2/3 and 4 VC 2/3 of cutoff valve VC 2/3, duct 108, duct 109, chambers 6 VC 3/4 and 7 VC 3/4 of valve VC 3/4, duct 110, chambers 10 VC and 11 VC of valve VC in position 1, duct 111, chambers 7 VB and 6 VB of valve VB in position 0, this latter chamber 6 VB being at 0, and, on the other hand, interruption of the communication between chambers 6 VC 2/3 and 5 VC 2/3 of valve VC 2/3, which causes feeding of clutch $E_3$ to be done only by calibrated jet 100 of small passage section. It should be noted that, during this second phase, the feed circuit of clutch $E_1$ through a jet equivalent to a large passage section is not affected. At the end of this phase, the transmission is on the forward third gear first power division configuration (3 DP), i.e., state number 16 (1011) of FIG. 3A.

Figure 17:
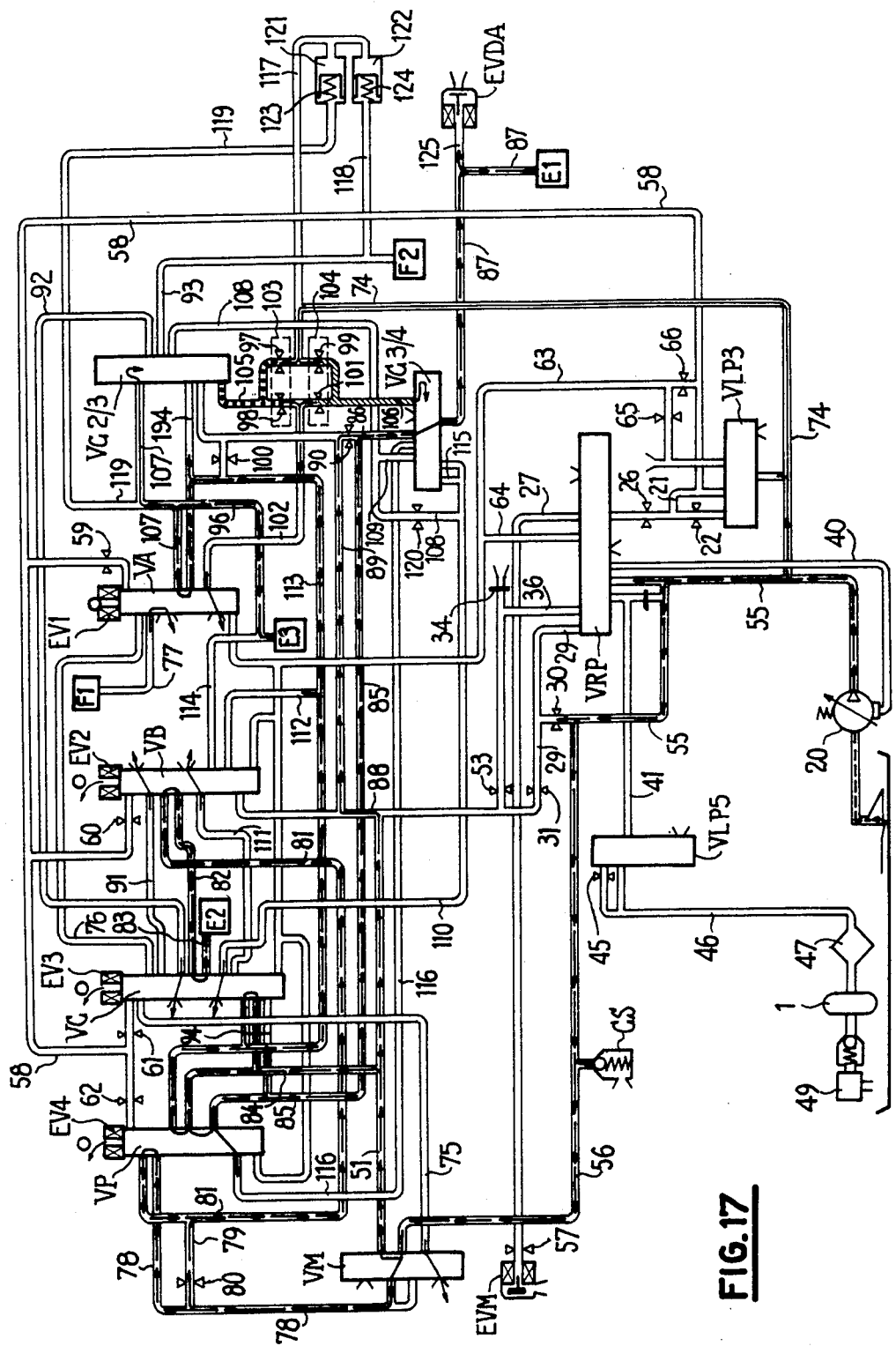
FIG. 17 shows the configuration of the hydraulic circuit for the third transitory phase of a shift of hydraulic second gear (2H)-mechanical third gear (3M), as well as the stable state of mechanical third gear (3M)

The third phase of shifting from hydraulic second (2H) to mechanical third (3M) is shown in FIG. 17. This third phase is initialized by transition from state number 16 of solenoid valves EVi (i=1-4) or (1011) to state number 17 or (1000), which triggers filling of clutch $E_2$ by the same feed circuit in large passage section as that which prevails for this clutch $E_2$ in hydraulic third configuration (3H). The feed circuits of clutches $E_1$ and $E_3$ remain unchanged in relation to the preceding phase.

Figure 18:
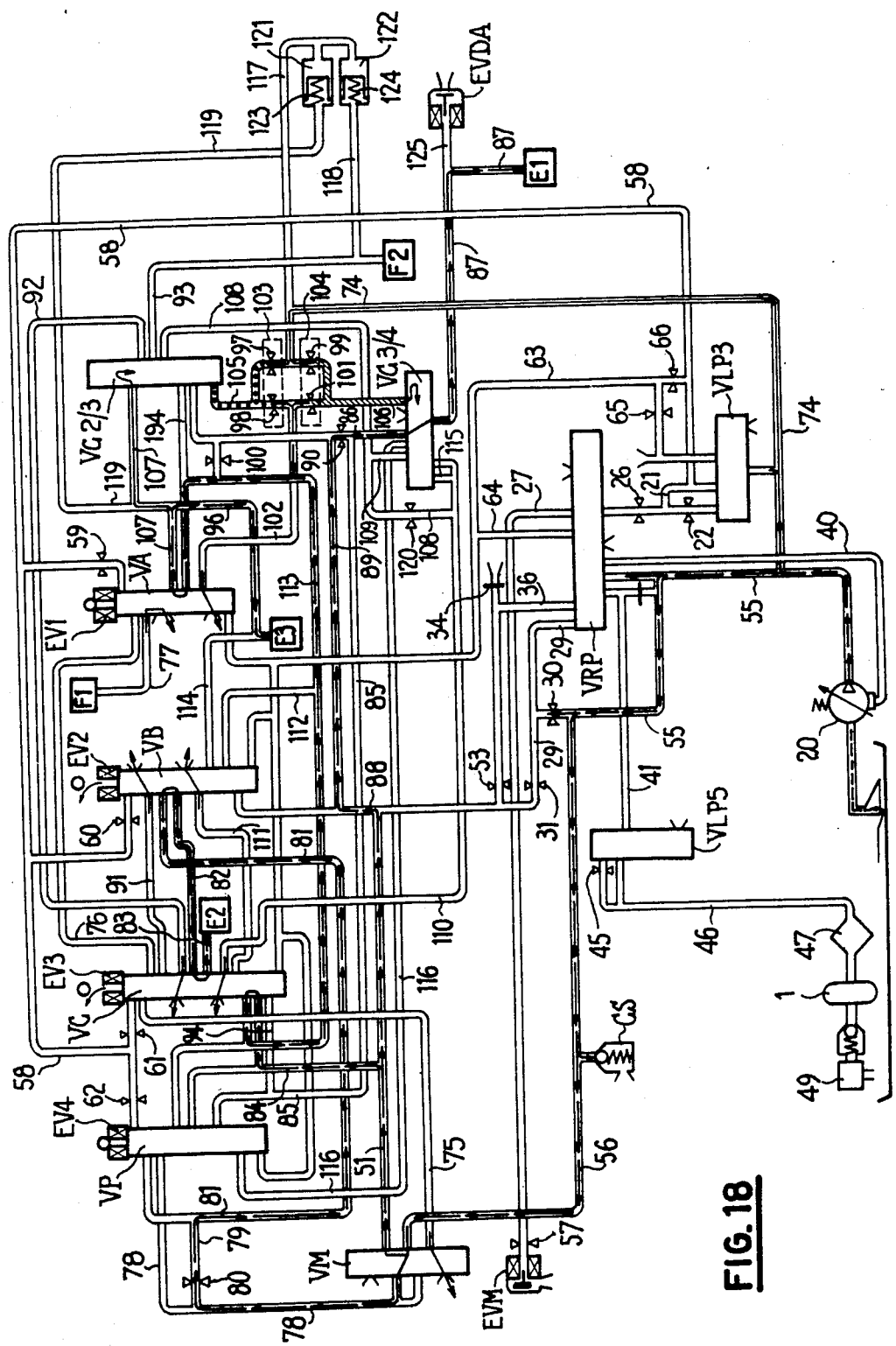
FIG. 18 shows the configuration of the hydraulic circuit for the fourth transitory phase of a shift of hydraulic second gear (2H)-mechanical third gear (3M)

The fourth phase of shifting from hydraulic second (2H) to mechanical third (3M) is shown in FIG. 18. This fourth phase is initialized by swinging of valve VP into position 1 (state number 18 of solenoid valve EVi or 1001), which causes the feeding of clutch $E_2$ through jet 80 of small passage section because of the stopping of communication between chambers 2 VP and 3 VP of valve VP. This swinging of valve VP also causes feeding of clutch $E_1$ through calibrated jet 90 of small passage section because of the stopping of communication between chambers 5 VP and 6 VP of valve VP. This latter point does not exhibit any drawback to the extent that the torque transmitted by clutch $E_1$ keeps on diminishing during "bridging" of planetary gear train 2 by clutch $E_2$.

The locking phase of the shift from hydraulic second (2H) to mechanical third (3M) is marked by the return to position 0 of valve VP (solenoid valves EVi are again at state number 17), which reestablishes the communication between chambers 2 VP and 3 VP of valve VP, and chambers 5 VP and 6 VP, and therefore feeding in large passage section of clutches $E_1$ and $E_2$.

Figure 19:
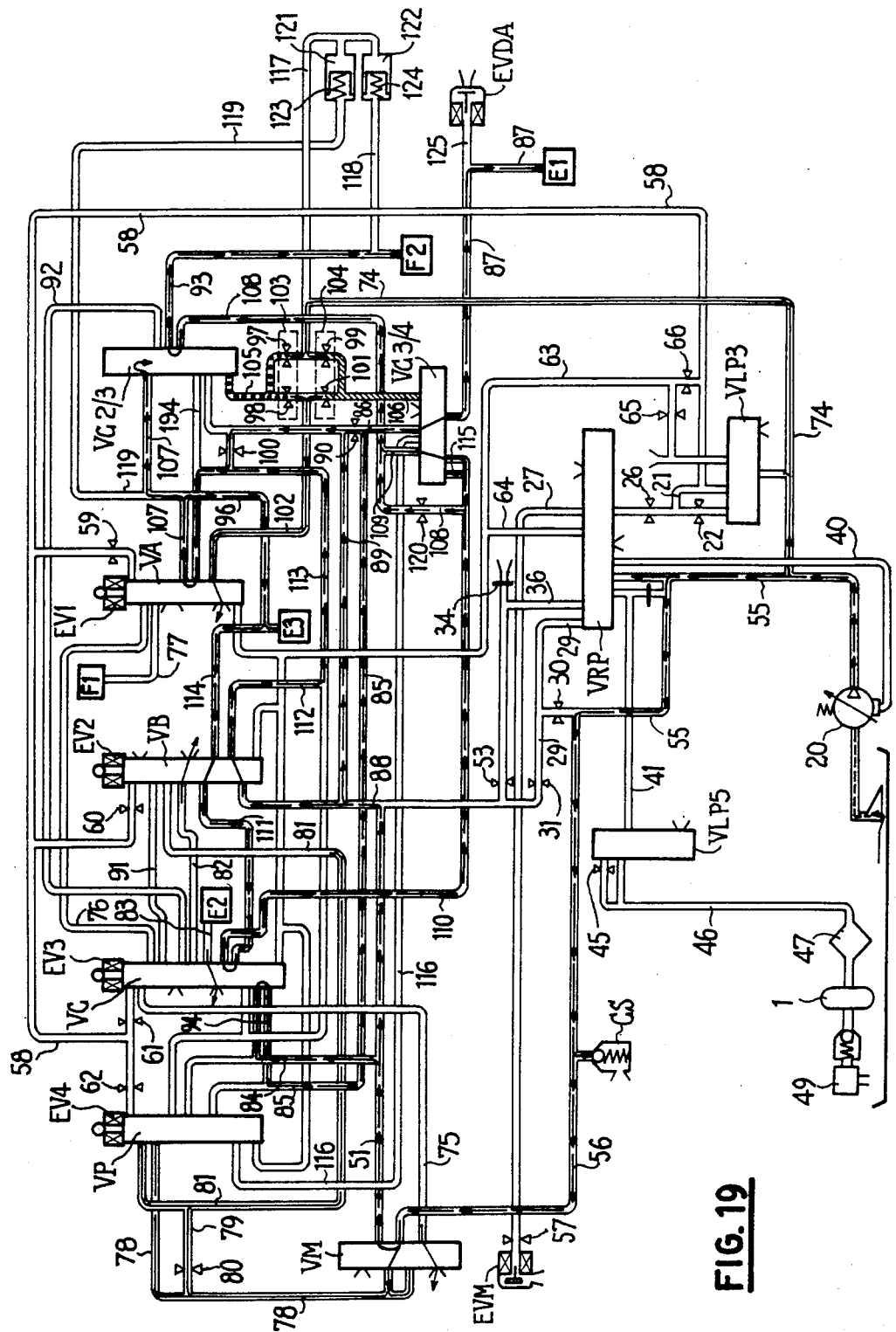
FIG. 19 shows the configuration of the hydraulic circuit for the first transitory phase of a shift of mechanical third gear (3M)-mechanical fourth gear (4M)

Shifting of forward mechanical third gear (3M) to forward mechanical fourth gear (4M) is triggered by passage of solenoid valves EVi (i=1-4) from state number 17 (1000) to state number 21 (1111), characterizing the first phase of this shift, which is shown in FIG. 19. During this first phase, clutch $E_1$ is always in large passage section from chamber 2 VM of valve VM, through duct 51, duct 84, chambers 13 VC and 14 VC of valve VC in position 1, duct 94, duct 85, duct 86, chambers 4 VC 3/4 and 3 VC 3/4 of valve VC 3/4, and duct 87. Clutch $E_1$ is also fed in parallel by duct 88, duct 89 and jet 90 of small passage section. Also clutch $E_3$ is always fed in large passage section from chamber 2 VM of valve VM, by duct 51, duct 88, chambers 10 VB and 9 VB of valve VB in position 1, duct 112, duct 113, duct 94, chambers 6 VA and 5 VA of valve VA in position 1, duct 107 and duct 96. Clutch $E_3$ is also fed in parallel by duct 89, and jet 100 of small passage section. Filling of brake $F_2$ is performed in large passage section from chamber 2 VM of valve VM, and through the same feed circuit as that of clutch $E_3$ to the junction of duct 96 with duct 114, through chambers 8 VB and 7 VB of valve VB in position 1, duct 111, chambers 11 VA and 10 VA of valve VA in position 1, duct 110, chambers 7 VC 3/4 and 6 VC 3/4 of valve VC 3/4, duct 109. Filling of brake $F_2$ is also done in parallel by duct 108 through calibrated jet 120 of small passage section, chambers 4 VC 2/3 and 3 VC 2/3 of valve VC 2/3, and duct 93. Moreover, the filling pressure of brake $F_2$ is brought to the left end of spool 132 of cutoff valve VC 3/4, i.e., in chamber 8 VC 3/4 of this valve, by duct 115.

Figure 20:
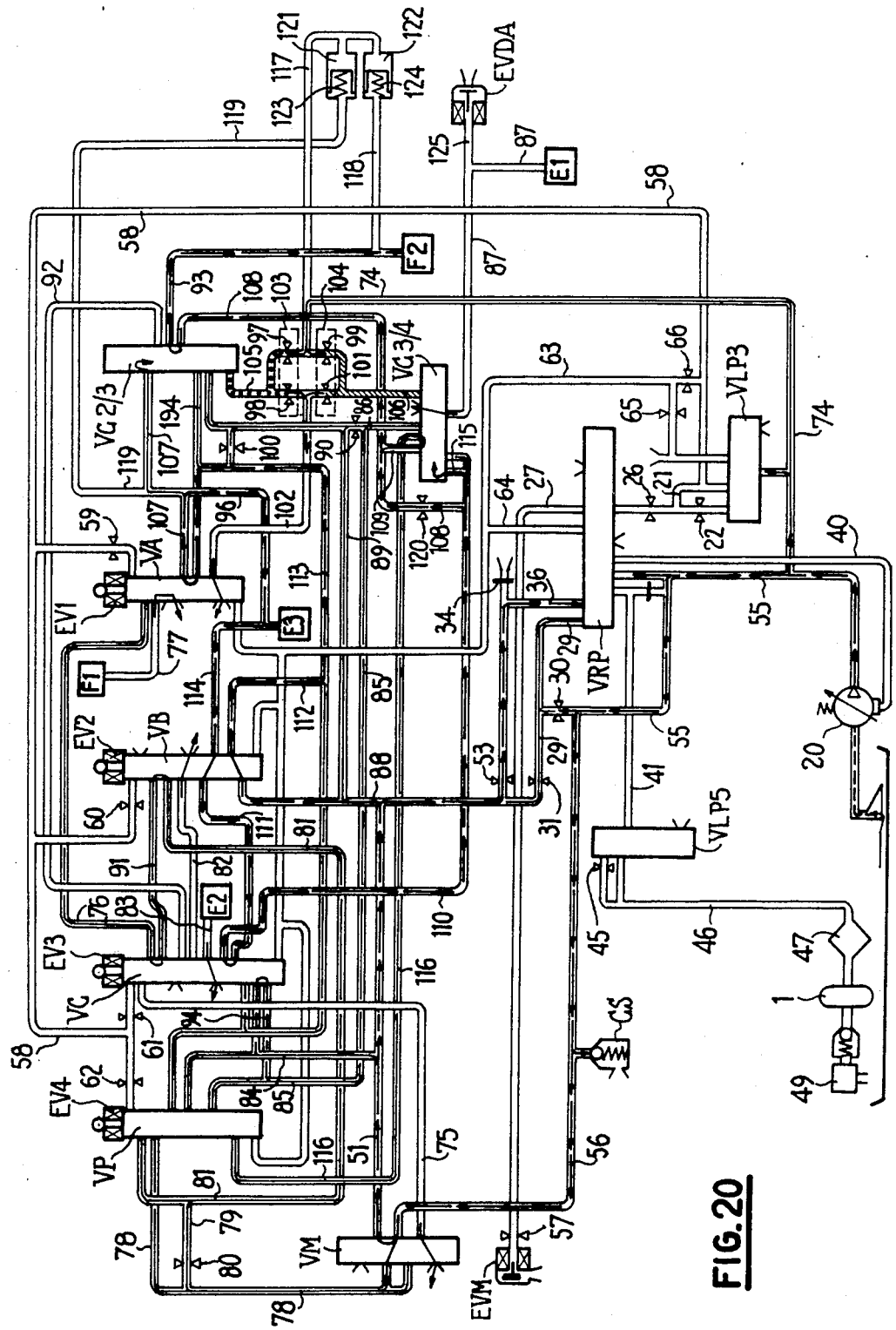
FIG. 20 shows the configuration of the hydraulic diagram for the second transitory phase of a shift of mechanical third gear (3M)-mechanical fourth gear (4M)

When the filling pressure of brake $F_2$ exceeds pressure $P_4$, cutoff valve VC 3/4 swings and initializes the second phase of the shift from mechanical third (3M) to mechanical fourth (4M), which is shown in FIG. 20. The swinging of valve VC 3/4 causes setting at 0 of clutch $E_1$ by duct 87, chamber 3 VC 3/4 and chamber 2 VC 3/4 of valve VC 3/4, this latter chamber itself being at 0. The swinging of valve VC 3/4 also causes stopping of feeding in large passage section of brake $F_2$. Actually communication between chambers 7 VC 3/4 and 6 VC 3/4 of valve VC 3/4 is stopped, which allows only feeding by duct 108 and jet 120 of small passage section.

Figure 21:
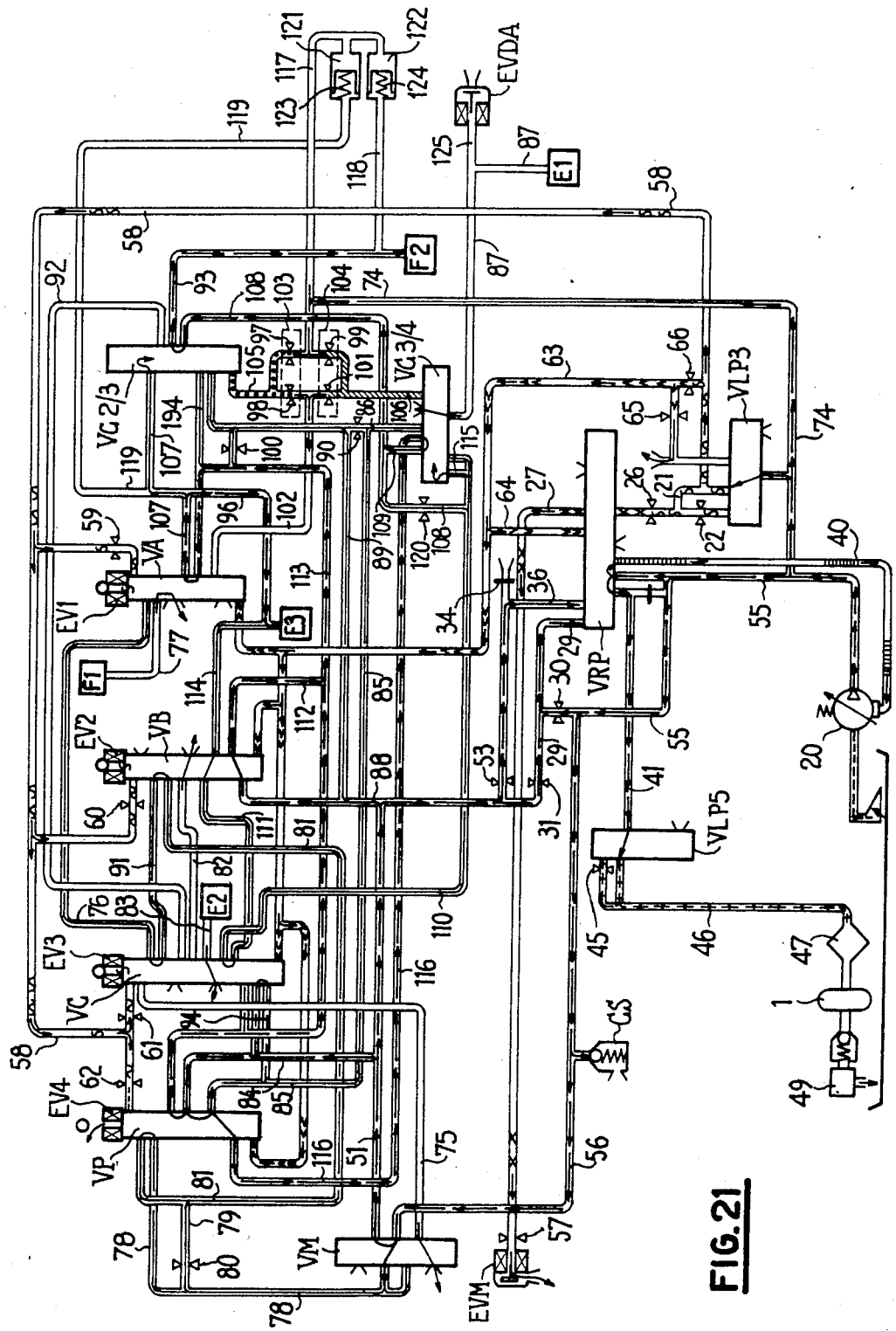
FIG. 21 shows the configuration of the hydraulic diagram for the stable state of the mechanical fourth gear (4M)

The third phase of shifting from mechanical third (3M) to mechanical fourth (4M) is shown in FIG. 21. This third phase is initialized by the passage from state number 22 (1111) of solenoid valves EVi (i=1-4) to state number 23 (1110). The return of valve VP to position 0 reestablishes feeding in large passage section of brake $F_2$. This feeding is done from chamber 2 VM of valve VM, chambers 5 VP, 6 VP and 7 VP of valve VP, duct 116, chambers 5 VC 3/4 and 6 VC 3/4 of valve VC 3/4, duct 109, duct 108, chambers 4 VC 2/3 and 3 VC 2/3 of valve VC 2/3 and duct 93, feeding in parallel by jet 120 of small passage section, moreover, being maintained. Further, feeding of clutch $E_3$ is also maintained through the circuit established during the preceding phase and corresponding to a large passage section.

At this point of the description of the totality of the hydraulic network according to the invention, it will be noted that the device is able to control hydraulic receivers equipped with accumulators. By way of nonlimiting example, accumulators are shown, particularly in FIG. 4, which are connected in parallel on the feed circuits of brake $F_2$ and clutch $E_3$. Each of these accumulators consists of a piston 121, 122 on one of whose faces line pressure $P_L$ acts, while the other face receives the thrust of a spring 123, 124 and that of the feed pressure of the corresponding hydraulic receiver. Line pressure $P_L$ is carried by duct 117 connected to duct 74, while the feed pressure of brake $F_2$ arrives by duct 118 connected to duct 93, and the feed pressure of clutch $E_3$ is brought by duct 119 connected to duct 107.

After having detailed, as has just been done, shifting up, shifting down will be described.

In regard to shifting from forward mechanical fourth gear (4M) to mechanical third gear (3M), a breakdown similar to shifting from hydraulic second gear (2H) to mechanical third gear (3M) is observed. This shifting is therefore performed first by a shift from mechanical fourth gear (4M) to power division third gear (3DP), followed by a power division third bridging (3DP) to mechanical third (3M), this breakdown of the shifting being made necessary for the same reasons as those set forth above for shifting from hydraulic second (2H) to mechanical third (3M). But, while for a shift from hydraulic second (2H) to power division third (3DP) in first configuration, clutch $E_3$ is active, for a shift from mechanical fourth (4M) to power division third (3DP) in second configuration, clutch $E_1$ is active, which requires the particular sequences shown in FIGS. 22 and 23.

Figure 22:
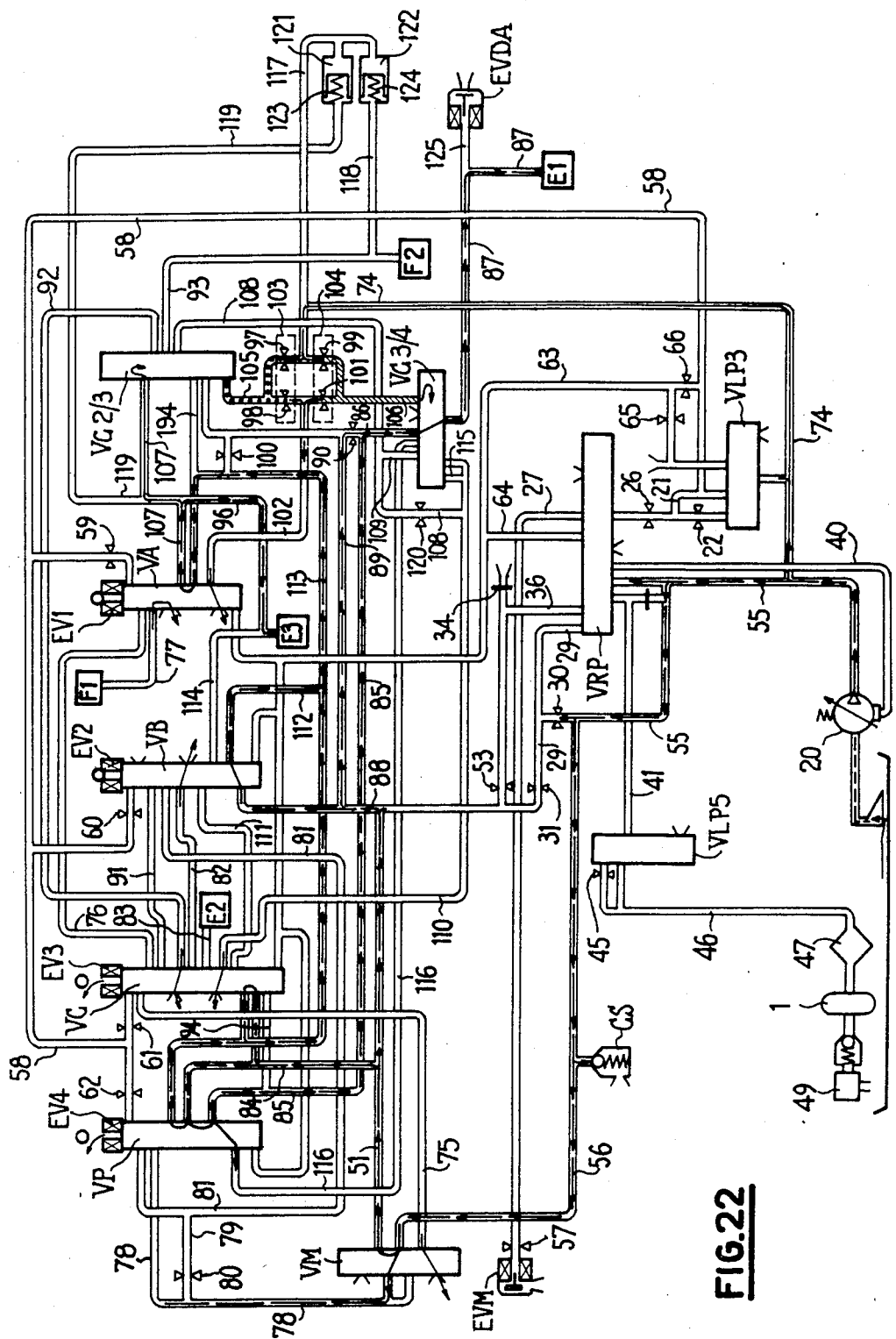
FIG. 22 shows the configuration of a hydraulic diagram for the first transitory state of a shift of mechanical fourth gear (4M)-mechanical third gear (3M)

The first phase of shifting from mechanical fourth (4M) to mechanical third (3M) is shown in FIG. 22. This first phase is initialized by transition from state number 23 (1110) of solenoid valves EVi (i=1-4) to state number 19 (1100). Swinging of valve VC from position 1 to position 0 causes, 1. Emptying of brake $F_2$ by duct 93, chambers 3 VC 2/3 and 4 VC 2/3 of valve VC 2/3, duct 108, duct 109, chambers 6 VC 3/4 and 7 VC 3/4 of valve VC 3/4, and in parallel with jet 120, duct 110, chambers 10 VC and 9 VC of valve VC, this latter chamber being at 0.

2. Swinging of valve VC 3/4 to the left under the thrust of pressure P$_4$, after setting of duct 115 at 0, and chamber 8 VC 3/4 of valve VC 3/4.

3. Filling in large passage section of clutch E$_1$ from chamber 2 VM of valve VM, by duct 84, chambers 5 VP and 6 VP of valve VP which is in position 0, duct 85, duct 86, chambers 4 VC 3/4 and 3 VC 3/4, and duct 87, in parallel with the circuit constituted by duct 51, duct 88, duct 89 and jet 90 of small passage section coming out in duct 86 already mentioned.

Figure 23:
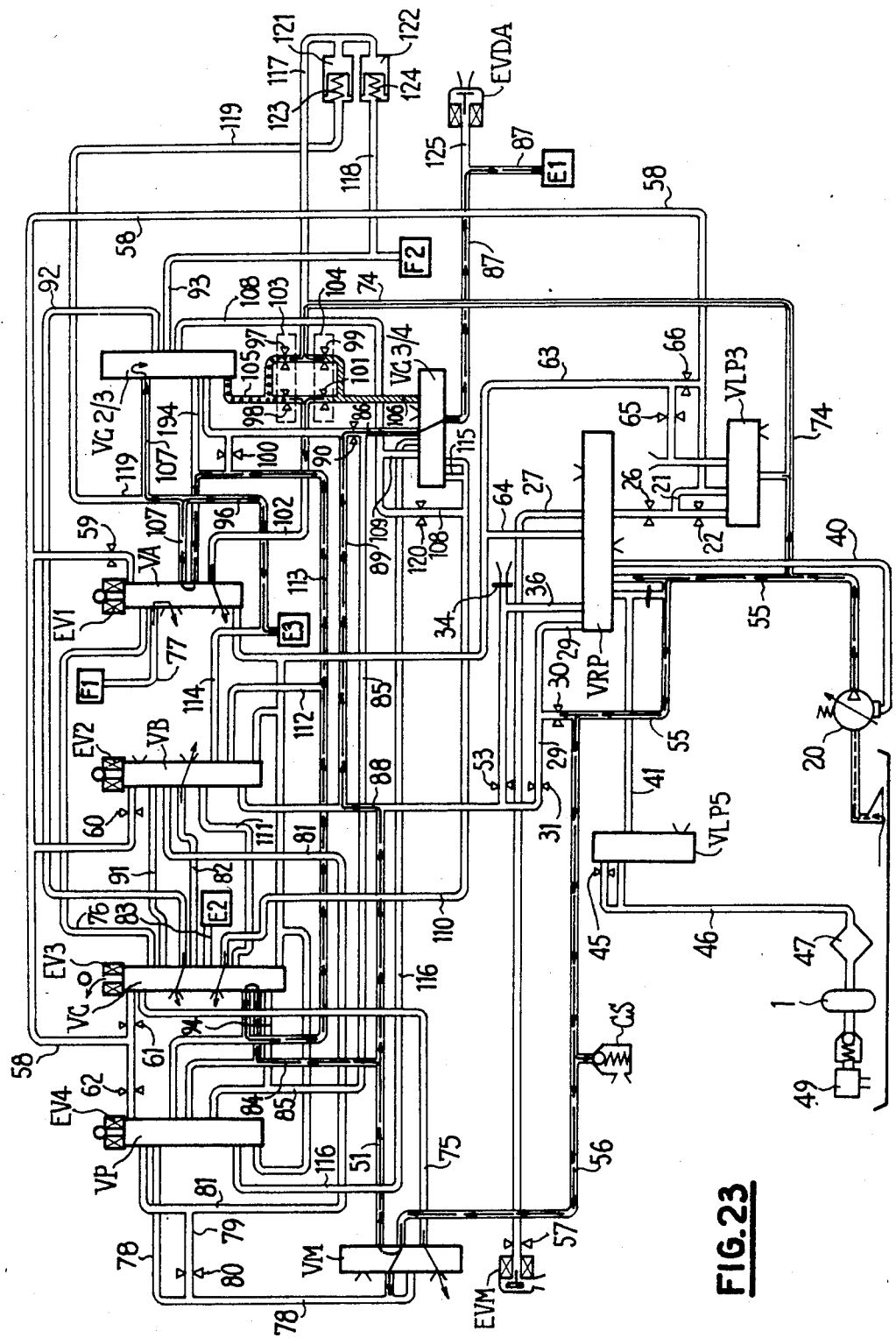
FIG. 23 shows the configuration of the hydraulic diagram for the second transitory state of a shift of mechanical fourth gear (4M)-mechanical third gear (3M)
Figure 24:
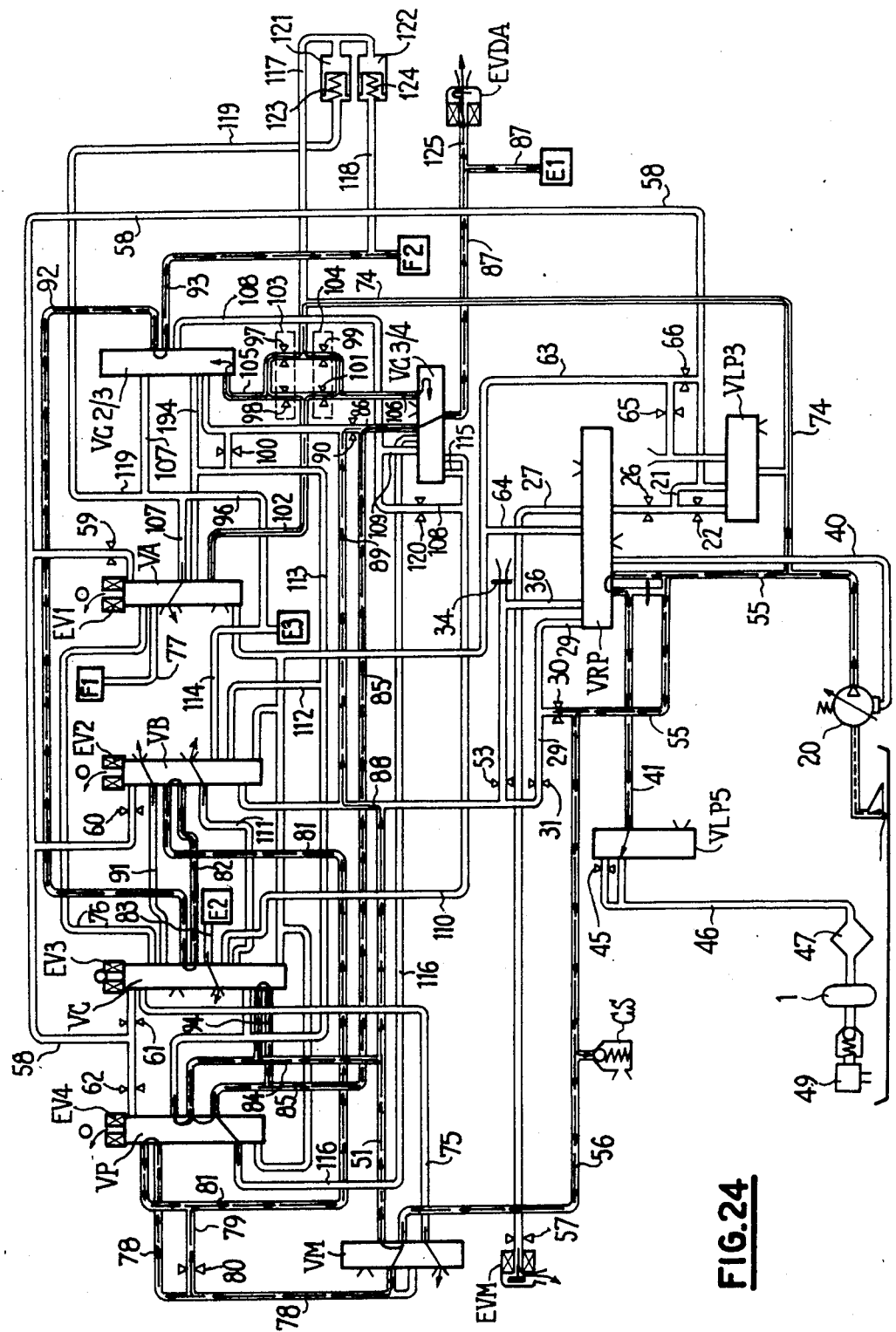
FIG. 24 shows, as a variant, the configuration of the hydraulic diagram for the second transitory state of a shift of mechanical fourth gear (4M)-hydraulic second gear (2H)

The second phase of the shift from mechanical fourth (4M) to mechanical third (3M) is shown in FIG. 23. This second phase, corresponding to state number 20 (1101), is caused by swinging of valve VP to position 1, which, by stopping communication between chambers 5 VP and 6 VP of valve VP, allows only feeding of clutch E$_1$ through calibrated jet 90 of small passage section.

Going on from there, mechanical third gear (3M), i.e, state number 17 (1000) is joined by transitory state number 18 (1001) shown in FIG. 18, as already set forth during the description of the bridging of power division third (3DP) to mechanical third (3M).

Shifting from mechanical third gear (3M) to hydraulic third gear (3H) is done very simply by transition from state number 17 (1000) to state number 5 (0000), which causes swinging of valve VA from position 1 to position 0. Swinging of valve VA causes emptying of clutch E$_3$ by duct 96, duct 107, and chambers 5 VA and 4 VA of valve VA, this latter chamber itself being at 0. This shift from hydraulic third gear (3H) makes it possible to benefit, under certain conditions of load and speed of the vehicle, from the filtering offered by the interposition of hydrokinetic torque converter 1 on the kinematic linkage between the engine and wheels.

Shifting from mechanical third gear (3M) to hydraulic second gear (2H) is done by transition from state number 17 (1000) to state number 12 (0010) which causes, in a first phase, emptying of clutch E$_3$ by the same network as in the preceding paragraph, emptying of clutch E$_2$ by duct 83, and chambers 8 VC and 9 VC of valve VC, this latter chamber itself being at 0, and finally filling of brake F$_2$ by the same network as used during the first phase of shifting from hydraulic first (1H) to hydraulic second (2H).

The second phase of this shifting, triggered by arrival of state number 13 on solenoid valves EVi (0011), is characterized by filling of brake F$_2$ through a small passage section, by the same network as that used during the second phase of shifting from hydraulic first (1H) to hydraulic second (2H).

The locking phase (return to state number 12 (0010)), is identical in every respect with that studied during shifting from hydraulic first (1H) to hydraulic second (2H).

Shifting from mechanical fourth gear (4M) to hydraulic second gear (2H) is done in a slightly different way, depending on whether the device according to the invention comprises a stop declutching system or not, such as described in French patent application No. 83/04 636.

In case the stop declutching system is not present, shifting from mechanical fourth (4M) to hydraulic second (2H) is done simply by transition from state number 23 (1110) to state number 12 (0010). Thereby, clutch E$_3$ is emptied by duct 96, duct 107, chambers 5 VB and 4 VB of valve VB which is in position 0, this latter chamber 4 VB being at 0, while clutch E$_1$ is filled in large passage section by the same circuit as that indicated in FIG. 22.

In case of the presence of a stop declutching system, the device according to the invention is further provided with a stop declutching solenoid valve EVDA, of the normally closed type, and which is arranged according to French patent application No. 83/04 636. This stop declutching solenoid valve EVDA is connected at the end of duct 125, in bypass connection on duct 87 of the feed of clutch E$_1$. In this case, shifting from mechanical fourth gear (4M) to hydraulic second gear (2H) is done by transition from state number 23 (1110) to state number 14 (0010), which is distinguished from state number 12 (0010) only by the fact that valve EVDA is kept open for an appropriate time by control device 17. Opening of valve EDVA has the effect of creating, on the feed circuit of clutch E$_1$, a leak flow which delays torque engagement on clutch E$_1$ so as suitably to detect the synchronism instant. As soon as device 17 stops sending the order for opening of valve EDVA, state number 12 (0010) is naturally reached, and the shifting ends as above.

Figure 25:
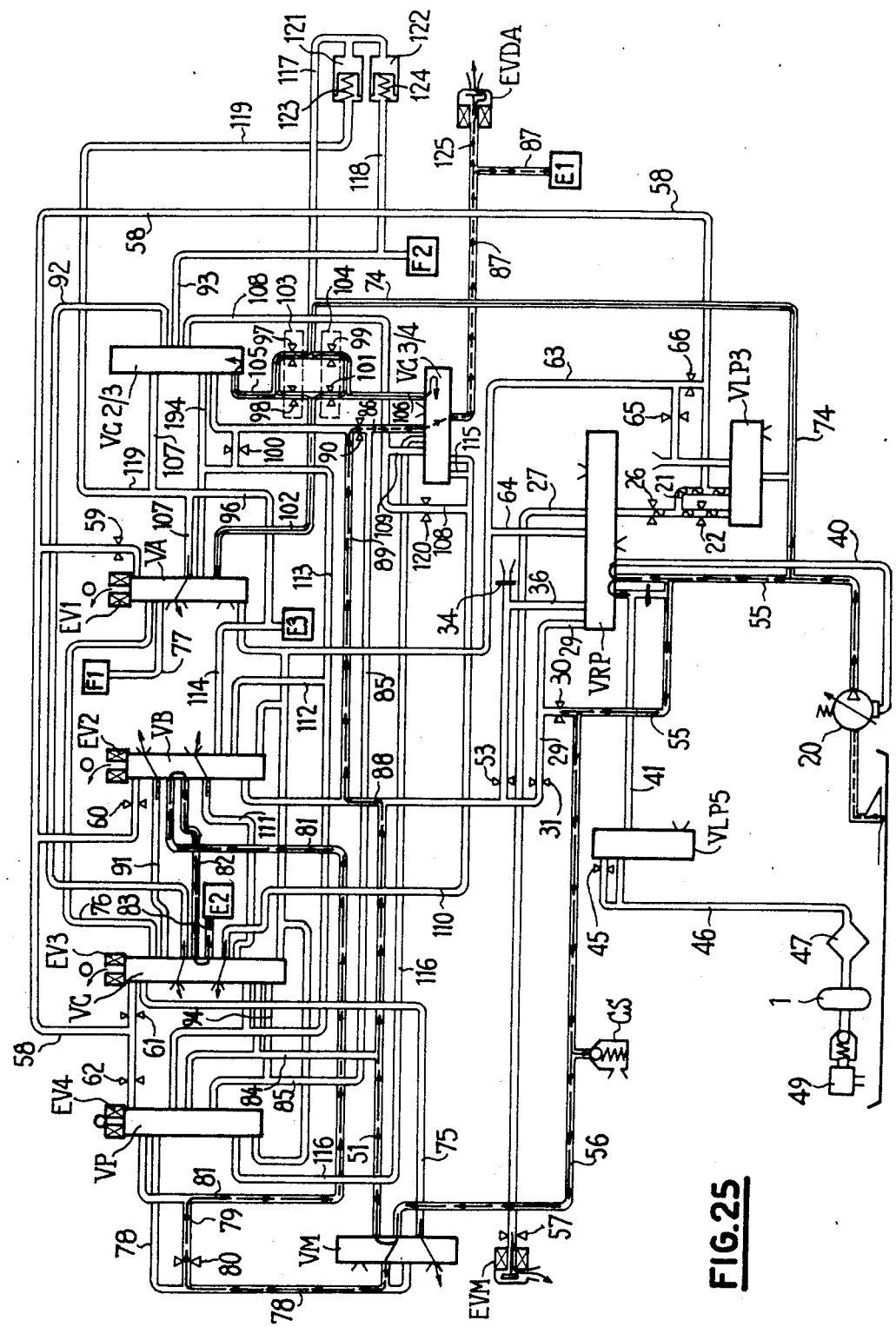
FIG. 25 shows the hydraulic diagram of the invention in stop declutching configuration.

Use of the stop declutching system, according to French patent application No. 83/04 636, requires measurement of the speed of turbine 6. Now, at stop, in hydraulic first gear (1H), in which only clutch E$_1$ is fed, the speed of turbine 6 is not accessible. Actually, the elements connected to turbine 6 are enclosed in a unit 3a turning at the speed of the motor and in housing 14a of clutch E$_2$, which prevents placement of a sensor. On the other hand, if clutch E$_2$ is completely locked, and clutch E$_1$ is partially filled but sliding according to the arrangements of French patent application No. 83/04 636, housing 14a turns at the speed of turbine 6. Thereby, it is then easy to install in housing 9 a speed sensor aimed at housing 14a and measuring its speed. The stop declutching configuration is described by state number 7 (0001), and it is shown in FIG. 25.

The stop declutching configuration is therefore similar to that of the state of hydraulic third (3H), except that the pressure in clutch E$_1$ is modulated by the opening of valve EDVA, which is controlled by device 17, according to French patent application No. 83/04 636, and the feed circuits in large passage section of clutchs E$_1$ and E$_2$ are stopped by valve VP in position 1, which cut off communication, respectively, between, chambers 5 VP and 6 VP, and chambers 2 VP and 3 VP of valve VP. Thereby, all that remains is feeding of clutch E$_1$ through jet 120, and feeding of clutch E$_2$ through jet 80.

In automatic transmissions controlled in the traditional way it is known that any untimely shifting of the selector lever into position R (reverse) when the vehicle is moving forward at an appreciable speed can lead to a serious accident and, in any case, to the more or less complete destruction of the transmission. The device according to the invention makes it possible to offer a solution to this safety problem. Actually, under these circumstances device 17 orders solenoid valves EVi (i=1-4) to take configuration 0010, whose corresponding state is shown in FIG. 26.

In this configuration, clutches E$_1$, E$_2$, E$_3$ and brake F$_1$ are set at 0. Clutch E$_1$ is set at 0 by duct 87, duct 89, duct 88, duct 51 and chamber 1 VM of valve VM. Clutch E$_2$ is set at 0 by duct 83 and chambers 8 VC and 9 VC of valve VC. Clutch E$_3$ is set at 0 by duct 96, duct 107 and chambers 5 VA and 4 VA of valve VA. Brake F₁ is set at 0 by duct 77, chambers 3 VA and 2 VA of valve VA, duct 76, chambers 3 VC and 4 VC of valve VC, duct 91 and chamber 2 VB of valve VB.

Figure 26:
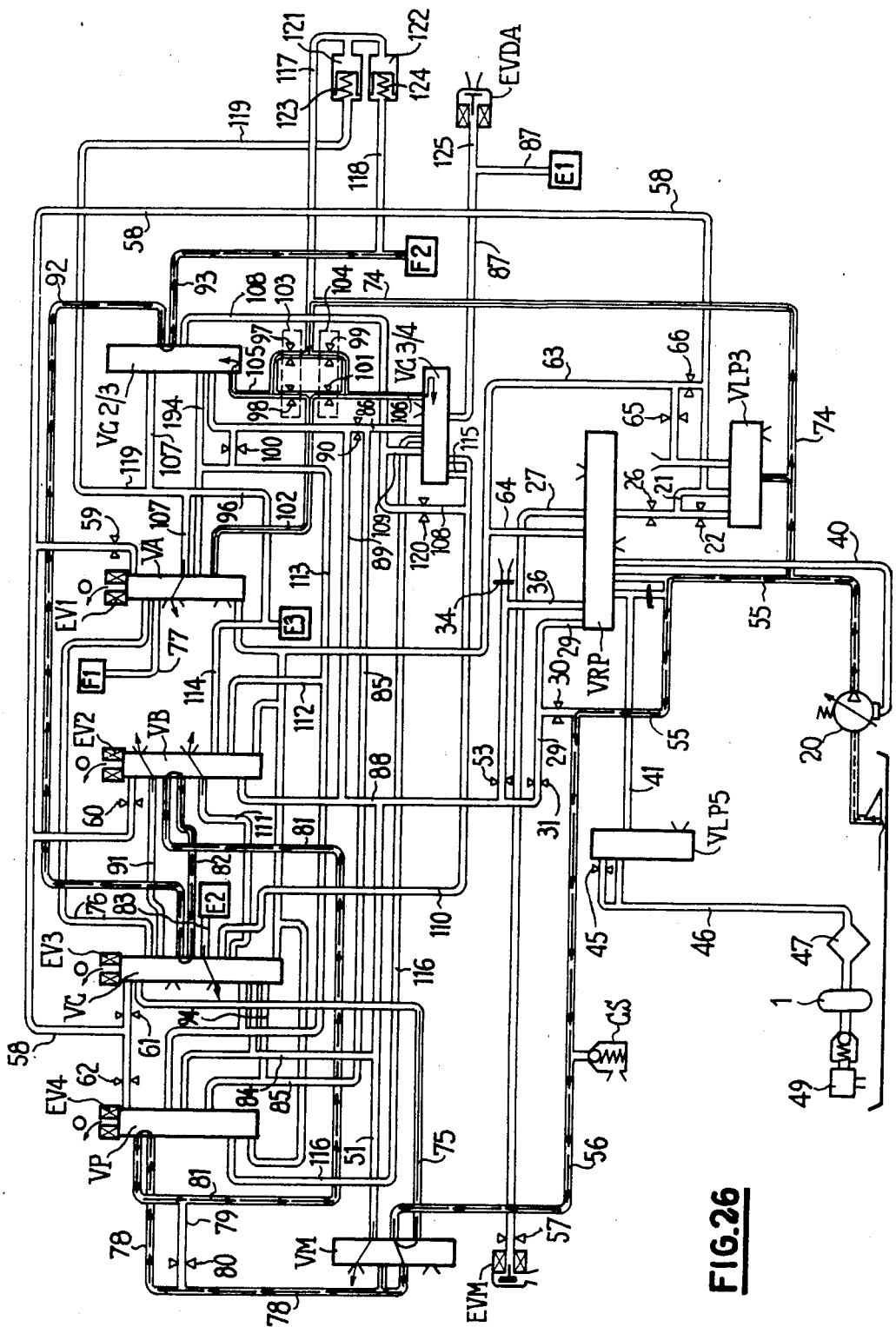
FIG. 26 shows the hydraulic diagram of the invention in safety configuration during an untimely maneuver of the selector lever from a forward position to reverse position.
Figure 27:
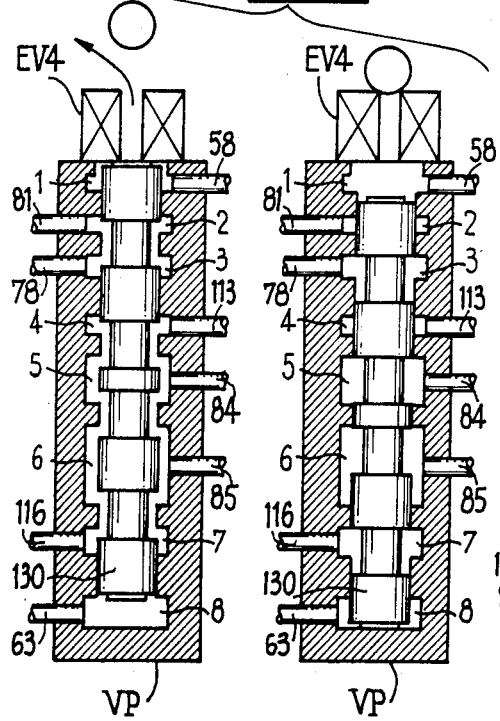
FIG. 27 shows, in section, the progressiveness valve VP with its solenoid valve, in rest position and in excited position.
Figure 28:
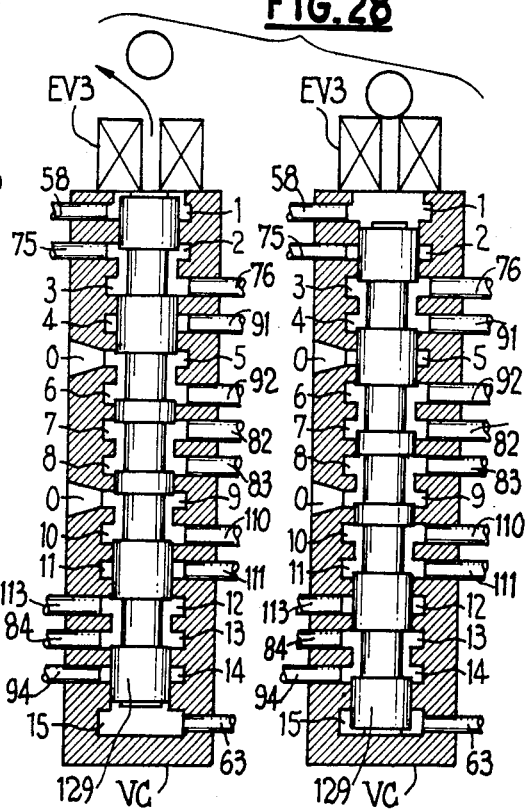
FIG. 28 shows, in section, sequence valve VC with its solenoid valve, in rest position and in excited position.
Figure 29:
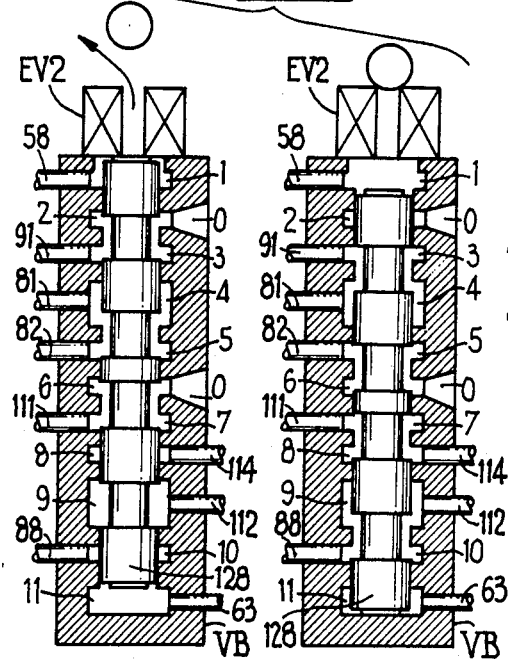
FIG. 29 shows, in section, sequence valve VB with its solenoid valve, in rest position and in excited position.
Figure 30:
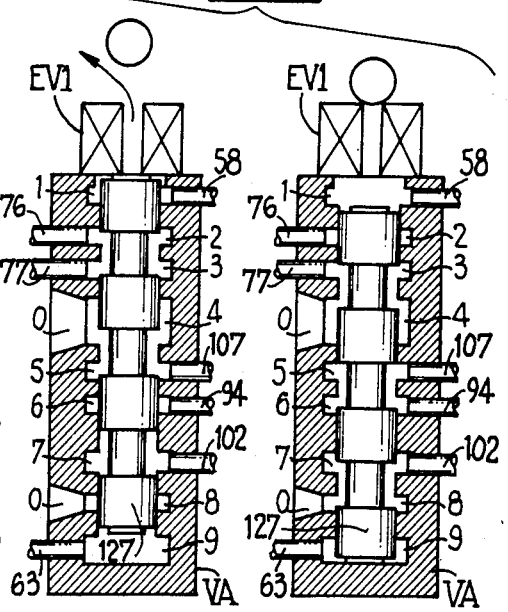
FIG. 30 shows, in section, sequence valve VA with its solenoid valve, in rest position and in excited position.

In the configuration shown in FIG. 26, only brake F₂ is fed, from chamber 5 VM of valve VM, by duct 78, chambers 3 VP and 2 VP of valve VP in position 0, duct 81, jet 80 connected in parallel between ducts 78 and 81, chambers 4 VB and 5 VB of valve VB in position 0, duct 82, chambers 7 VC and 6 VC of valve VC in position 1, duct 92, chambers 2 VC 2/3 and 3 VC 2/3 of valve VC 2/3 in rest position and duct 93. In the configuration obtained with only brake F₂ locked, planetary gear train 2 does not have any drive element. For this reason, the transmission is declutched, although the selector lever is in position R (reverse), which avoids any incident and any damage to the transmission.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A control system for an automatic transmission having four forward speeds and a reverse speed, said automatic transmission including a hydrokinetic torque converter having an integral torsion damper, said automatic transmission including a planetary gear train controlled by three clutches and two brakes, said clutches and brakes each being activated by hydraulic means, said control system comprising:
    a hydraulic distributor including means for selectively distributing hydraulic fluid to said hydraulic means of said clutches and brakes;
    four solenoid valves operatively connected to said means for selectively distributing for actuating said means for selectively distributing; and
    control means sensitive to vehicle operation data for controlling said four solenoid valves, wherein said means for selectively distributing comprises:
        means for distributing said hydraulic fluid at one of two flow rates for any line pressure by actuation of at least some of said four solenoid valves,
        three sequence valves each being connectable to a source of hydraulic fluid and having a movable spool connected to a respective one of three of said solenoid valves for distributing said hydraulic fluid, and
        a progressiveness valve connectable to said source of hydraulic fluid and having a movable spool connected to a fourth of said solenoid valves for distributing said hydraulic fluid,
    wherein said means for distributing at one of two rates comprises a feed duct for said hydraulic means for said clutches and brakes with a large passage section and including said progressiveness valve, in parallel with a feed duct for said hydraulic means for said clutches and brakes with a small passage section, whereby said hydraulic fluid can be supplied to said hydraulic means at a reduced flow rate by using said progressiveness valve to close said feed duct having said large passage section.

2. The system of claim 1 wherein said means for selectively distributing includes means for distributing at a higher of said two rates when at least some of said solenoid valves are not activated.

3. The system of claim 1 wherein said means for selectively distributing includes means for distributing hydraulic fluid to said clutches and brakes for providing one of said speeds when none of said solenoid valves are activated.

4. The system of claim 1 wherein said means for selectively distributing further comprise:
    a first cutoff valve connectable to a source of hydraulic fluid and having a two position spool movable to a position for further distribution of said hydraulic fluid only during a shift from a second to a third of said forward speeds; and
    a second cutoff valve connectable to a source of hydraulic fluid and having a two position spool movable to a position for further distribution of said hydraulic fluid only during a shift from a third to a fourth of said forward speeds.

5. The system of claim 4 wherein said means for selectively distributing further includes a manual valve connected in series with said sequence, progressiveness and cutoff valves and having a three position spool for selective further distribution of hydraulic fluid to said sequence, progressiveness and cutoff valves.

6. The system of claim 1 wherein at least one of the hydraulic means for said clutches and brakes includes an accumulator.

7. The system of claim 6 wherein said accumulator includes a spring biased piston.

8. The system of claim 4 wherein said first and second cutoff valves are connected in series with at least one of said sequence valves, including hydraulic potentiometers in ducts connected to each of said cutoff valves, whereby said potentiometers are active only during shifts to, and during operation of, said third and fourth speeds.

9. The system of claim 8 wherein said hydraulic potentiometers comprise jets in parallel ducts leading to said cutoff valves, at least one of said parallel ducts for each of said potentiometers communicating with said at least one of said sequence valves.

10. The system of claim 9 wherein the other one of said parallel ducts is connected directly to the output of a pump at a line pressure.

11. The system of claim 5 including means for providing a hydraulic line pressure and means for adjusting said line pressure, comprising:
    (a) a pressure control valve,
    (b) a first spool movable in said pressure control valve,
    (c) spring means in said pressure control valve for biasing said first spool in a first direction,
    (d) means for supplying a controlled hydraulic reference pressure to a differential section of said first spool for moving said first spool in a direction opposite said first direction,
    (e) means for modulating said controlled reference pressure,
    (f) a second spool in said pressure control valve, said second spool being movable in said direction opposite said first direction into contact with said first spool,
    (g) means for supplying hydraulic pressure to said second spool for moving said second spool in said direction opposite said first direction, comprising:

(i) a first hydraulic line connected to said pressure control valve for supplying hydraulic pressure to said second spool,
(ii) said manual valve movable into two of said three positions thereof for selectively connecting said first line to one of said line pressure and zero pressure,
(iii) a second hydraulic line connected between said first hydraulic line and a source of said line pressure,
(iv) a first restriction in said first line at a position between said manual valve and a point of connection with said second line, and
(v) a second restriction in said second line, whereby when said manual valve is in a position for connecting said first line to zero pressure, said first and second restrictions define a second hydraulic potentiometer reducing said line pressure.

12. The system of claim 11 wherein said means for modulating said controlled reference pressure comprise:
a hydraulic line connecting said differential section of said first spool with zero pressure; and
a modulating solenoid valve for adjusting a sectional area of said hydraulic line connecting said differential section with zero pressure.

13. The system of claim 11 including means for selectively subjecting said first spool to said line pressure for moving said first spool in said direction opposite said first direction, and for selectively subjecting said second spool to said line pressure for moving said second spool in said first direction.

14. The system of claim 13 wherein said means for selectively subjecting comprise:
a third line connected to said pressure control valve at a position such that hydraulic pressure therein acts on said first spool in said direction opposite said first direction and acts on said second spool in said first direction; and
variable restriction means for selectively communicating said third line with one of said first line pressure and a region at zero pressure.

15. The system of claim 11 including means for supplying said controlled reference pressure.

16. The system of claim 15 wherein said means for supplying said controlled reference pressure comprise:
a second pressure control valve having at least a third spool slidable therein;
second spring means biasing said spool in a second direction;
means for supplying hydraulic pressure to said third spool in a direction in opposition to said second direction, whereby movement of said third spool will maintain said hydraulic pressure at said controlled reference pressure; and
means for providing a second controlled reference pressure different from said controlled reference pressure and varying as a function of said controlled reference pressure.

17. The device of claim 16 wherein said means for providing a second controlled reference pressure comprises:
a first output conduit at said first controlled reference pressure;
a second output conduit connected to said first output conduit and having a first calibrated jet therein;
a bypass conduit connected between said second output conduit at a point downstream from said first calibrated jet and a region of zero pressure; and
a second calibrated jet in said bypass conduit.

18. The device of claim 16 wherein said means for providing a second controlled reference pressure comprises:
a fourth spool in said second pressure control valve;
means for supplying said first controlled reference pressure to said fourth spool for moving said fourth spool in a third direction;
third spring means for biasing said fourth spring in a direction opposite said fourth direction; and
means for supplying hydraulic pressure to said fourth spool for moving said fourth spool in said direction opposite said fourth direction, whereby movement of said fourth spool will maintain said hydraulic pressure supplied in said direction opposite said fourth direction at said second controlled pressure.

19. The device of claim 17 wherein said third spool is of a symmetric design.

20. The system of claim 16 including a third pressure control valve subject to said line pressure and providing a third controlled pressure to the hydrokinetic torque converter and a transmission lubricating circuit.

21. The system of claim 20 including means associated with said second pressure control valve for selectively cutting off said line pressure to said third pressure control valve when said line pressure drops below a predetermined value.

22. The system of claim 11 wherein said means for providing a hydraulic line pressure comprises a variable capacity pump having a capacity inversely proportional to a pressure at a pressure line thereof, wherein said pressure line is connected to said first pressure control valve, said first pressure control valve including means for communicating said pressure line with a region of zero pressure when said line pressure decreases below a predetermined value and with said line pressure when said line pressure increases beyond a predetermined value.

23. The system of claim 22 including means for supplying said second controlled pressure to said first pressure control valve.

24. The system of claim 12 wherein said modulating solenoid valve is positioned such that a leak orifice thereof is positioned at a top thereof.

25. The system of claim 3 including means such that said one of said speeds is reverse when said spool of said manual valve is in a first or reverse position.

26. The system of claim 5 including means such that said manual valve is not in a second or neutral position.

27. The system of claim 3 including means such that said one of said speeds is a third forward speed when said manual valve is in a third or automatic position.

28. The system of claim 5 including means such that when only a first and third of said sequence valves are open for further distributing hydraulic fluid, and said manual valve is in an automatic position, said clutches and brakes for said first forward speed are supplied with hydraulic fluid.

29. The system of claim 5 including means such that when only a first of said sequence valves are open for further distributing hydraulic fluid, and said manual valve is in an automatic position, said clutches and brakes for said first forward speed with engine braking are supplied with hydraulic fluid.

30. The system of claim 5 including means such that when only a first and second of said sequence valves are open for further distributing hydraulic fluid, and said manual valve is in an automatic position, said clutches and brakes for said second forward speed are supplied with hydraulic fluid.

31. The system of claim 5 including means such that when only a second of said sequence valves are open for further distributing hydraulic fluid, and said manual valve is in an automatic position, said clutches and brakes for said third forward speed in a power division configuration are supplied with hydraulic fluid.

32. The system of claim 5 including means such that when only second and third sequence valves are open for further distributing hydraulic fluid, and said manual valve is in an automatic position, said clutches and brakes for said first forward mechanical speed are supplied with hydraulic fluid.

33. The system of claim 5 including means such that when only a third of said sequence valves are open for further distributing hydraulic fluid, and said manual valves is in an automatic position, said clutches and brakes for said third forward speed in a second power division configuration are supplied with hydraulic fluid.

34. The system of claim 5 including means such that when none of said sequence valves are open for further distributing hydraulic fluid, and said manual valve is in an automatic position, said clutches and brakes for said fourth mechanical speed are supplied with hydraulic fluid.

35. The system of claim 5 wherein said control means are constructed such that when said control means senses said vehicle moving forward and senses said manual valve spool moving from an automatic forward position to a reverse position, first and second of said sequence valves are open for further distributing hydraulic fluid to said clutches and brakes for declutching said transmission.

36. The system of claim 1 including a stop declutching solenoid valve mounted in a fluid bypass of one of said clutches.

37. A process for control of an automatic transmission having a planetary gear system for four forward speeds with shifting under torque and including first, second and third clutches as well as first and second brakes for said planetary gear system, wherein a forward mechanical third gear is established when hydraulic pressure is fed to all of said clutches, a forward hydraulic second gear is established when hydraulic pressure is fed to a first of said clutches and a second of said brakes, and a forward mechanical fourth gear is established when hydraulic pressure is fed to a third of said clutches and a second of said brakes, said process comprising shifting to said mechanical third gear from one of said hydraulic second gear and said mechanical fourth gear by the steps of:
  shifting to a power division third gear by establishing hydraulic fluid pressure in said first and third clutches;
  locking the elements of said planetary gear system by establishing hydraulic fluid pressure in said second clutch.

* * * * *